(12) United States Patent
Takita et al.

(10) Patent No.: US 6,192,485 B1
(45) Date of Patent: Feb. 20, 2001

(54) REDUNDANT APPARATUS

(75) Inventors: Masatoshi Takita; Kazuei Ohnishi; Takamitsu Saito, all of Kanagawa (JP)

(73) Assignee: Fujitsu Limited, Kawasaki (JP)

( * ) Notice: Under 35 U.S.C. 154(b), the term of this patent shall be extended for 0 days.

(21) Appl. No.: 09/075,315

(22) Filed: May 8, 1998

(30) Foreign Application Priority Data

Jan. 13, 1998 (JP) .................................................. 10-004629

(51) Int. Cl.⁷ .................................................. G06F 11/00
(52) U.S. Cl. .................................................. 714/6; 714/25
(58) Field of Search .................................. 714/6, 2, 7, 8, 714/11, 13, 25, 31, 37, 39, 43, 47, 3, 15; 395/575, 500.05, 425

(56) References Cited

U.S. PATENT DOCUMENTS

| | | | |
|---|---|---|---|
| 5,276,823 | * | 1/1994 | Cutts, Jr. et al. ..................... 395/575 |
| 5,313,386 | * | 5/1994 | Cook et al. ........................... 364/187 |
| 5,473,771 | * | 12/1995 | Burd et al. ....................... 395/182.02 |
| 5,485,604 | * | 1/1996 | Miyoshi et al. ................. 395/182.08 |
| 5,491,787 | * | 2/1996 | Hashemi ........................... 395/182.09 |
| 5,544,304 | * | 8/1996 | Carlson et al. .................. 395/182.08 |
| 5,610,913 | * | 3/1997 | Tomonaga et al. ................... 370/219 |
| 5,630,056 | * | 5/1997 | Horvath et al. ................. 395/185.09 |
| 5,633,999 | * | 5/1997 | Clowes et al. .................. 395/182.04 |
| 5,812,754 | * | 9/1998 | Lui et al. ......................... 395/182.04 |
| 5,838,900 | * | 11/1998 | Horvath et al. ................. 395/185.09 |
| 5,983,371 | * | 11/1999 | Lord et al. .............................. 714/55 |

FOREIGN PATENT DOCUMENTS

| | | |
|---|---|---|
| 57-10845 | 1/1982 | (JP) . |
| 62-237535 | 10/1987 | (JP) . |
| 06053995 | 2/1994 | (JP) . |
| 08036502 | 2/1996 | (JP) . |

* cited by examiner

*Primary Examiner*—Nadeem Iqbal
(74) *Attorney, Agent, or Firm*—Helfgott & Karas, P.C.

(57) ABSTRACT

In a redundant apparatus formed of an active unit and a stand-by unit, an upper unit is connected to the active unit though the connection controller in the normal operation, and controls the connection controller to switch the active unit over to the stand-by unit when a fault has occurred in the active unit. The connection controller includes a diagnosis portion which diagnoses the stand-by unit or the active unit with a test signal and notifies the result to the upper unit.

22 Claims, 18 Drawing Sheets

ACT : ACTIVE STATE
SBY : STAND-BY STATE
OUS : MAINTENANCE/OUT OF SERVICE STATE
DIA-OUS : DIAGNOSIS-OUT OF SERVICE STATE

ACT : ACTIVE STATE
SBY : STAND-BY STATE
OUS : MAINTENANCE/OUT OF SERVICE STATE

REDUNDANT APPARATUS

BACKGROUND OF THE INVENTION

1. Field of the Invention

The present invention relates to a redundant apparatus, and in particular to a redundant apparatus which is formed of an active unit and a stand-by unit to which the active unit is switched over when a fault has occurred in the active unit.

In recent years, an information processing system has been made large-sized and complicated increasingly. Especially in a system which works on-line i.e. in real time, a fault partially generated may influence on the whole system to cause a big damage.

To deal with such a fault, there are the art of redundancy to cover the influence of the fault, the art of diagnosing and repairing the fault, and the art in which the former two arts are combined. Among these arts, the art of redundancy is utilized in a redundant apparatus which switches an active unit over to a stand-by unit when a fault has occurred, and diagnoses and repairs the fault to shorten an unavailable time of the system.

In such a redundant apparatus, it has become more and more important to have a restoration speed by which the system has no influence of a fault, and to have an effect for the cost.

2. Description of the Related Art

FIG. 17 shows an arrangement of an electronic switchboard known as the prior art of a redundant apparatus. This apparatus is formed of a circuit equipment DTSH connected to a subscriber 1 and a subscriber 2, and an upper unit 100 connected to this circuit equipment DTSH with a control signal circuit C and main signal circuits A0–A2. The upper unit 100 is formed of a controller 110 connected to the control signal circuit C, a switch portion 120 connected to the main signal circuits A0–A2 and the controller 110, and a diagnosis portion 212 connected to the switch portion 120.

The circuit equipment DTSH is formed of a switch-over portion 300 connected to the subscribers 1 and 2, circuit corresponding equipments (abbreviated as CCE) DT0–DT2 connected to the switch-over portion 300 with the main signal circuits A6–A8 respectively, and a circuit controller DTC which is connected to the circuit corresponding equipments DT0–DT2 with main signal circuits A3–A5 respectively and also connected to the control signal circuit C and the main signal circuits A0–A2.

It is to be noted that the main signal circuits A0, A3, and A6, the main signal circuits A1, A4, and A7, and the main signal circuits A3, A5, and A8 are the same as the main signal circuits A0, A1, and A2, respectively. Therefore, in the following descriptions the main signal circuits A0, A1, and A2 represent the other main signal circuits. Moreover, the main signal circuits A0, A1, and A2 which connect the circuit controller DTC to the switch portion 120 can be one logical circuit as a high way.

In a normal operation, the circuit corresponding equipments DT0, DT1 are preset as an active unit. By the switch-over portion 300, the circuit corresponding equipments DT0 and DT1 are connected to the subscribers 1 and 2, respectively. The circuit corresponding equipment DT2 is preset as a stand-by unit, and is not connected to either of the subscribers 1 or 2. Namely, the equipment DT2 is a stand-by circuit corresponding equipment.

As shown in FIG. 17, the subscriber 1 and the switch portion 120 are fixedly connected with the main signal circuit A0 through the switch-over portion 300, the circuit corresponding equipment DT0, and the circuit controller DTC. In the same way, the subscriber 2 and the switch portion 120 are fixedly connected with the main signal circuit A1 through the switch-over portion 300, the circuit corresponding equipment DT1, and the circuit controller DTC.

The diagnosis portion 212 sends to the stand-by circuit corresponding equipment DT2 a test signal on the main signal circuit A2 through the switch portion 120 and the circuit controller DTC under the control of the controller 110, thereby diagnosing from the response signal whether or not the circuit corresponding equipment DT2 is normal.

FIG. 18 shows an operation example in the case where a fault has occurred in the circuit corresponding equipment DT0 shown in FIG. 17. Having received a notification that the fault has occurred in the circuit corresponding equipment DT0 from the circuit controller DTC, the controller 110 makes the switch-over portion 300 separate the circuit corresponding equipment DT0 from the subscriber 1 in order to withdraw the circuit corresponding equipment DT0 from its active state.

After having instructed the switch portion 120 to set again a passage from the main signal circuit A0 to the main signal circuit A2, the controller 110 makes the switch-over portion 300 connect the stand-by circuit corresponding equipment DT2 to the subscriber 1 for the continuous operation.

Namely, different from FIG. 17, the subscriber 1 will be connected to the main signal circuit A2 through the switch-over portion 300, the stand-by circuit corresponding equipment DT2, the circuit controller DTC, and the switch portion 120.

The controller 110 sets again the passage of the switch portion 120 to connect the diagnosis portion 212 and the circuit corresponding equipment DT0 with the main signal circuit A0. After the circuit corresponding equipment DT0 as faulted is exchanged and repaired, the diagnosis portion 212 sends a test signal to the circuit corresponding equipment DT0 through the main signal circuit A0 by the instruction of the controller 110, thereby diagnosing the circuit corresponding equipment DT0 from the response signal. The result of this diagnosis is sent to the controller 120.

Recognizing from this diagnosis result that the circuit corresponding equipment DT0 has been restored to the normal state, the controller 110 puts the stand-by circuit corresponding equipment DT2 and the restored circuit corresponding equipment DT0 back to the stand-by state and the active state, respectively, and controls the switch portion 120 and the switch-over portion 300 back to the same connection as shown in FIG. 17.

It is to be noted that when the circuit corresponding equipment DT0 is faulted and the stand-by circuit corresponding equipment DT2 is active and the circuit corresponding equipment DT1 is also faulted, the subscriber 2 which is connected to the circuit corresponding equipment DT1 cannot use any circuit corresponding equipment because there is no stand-by circuit corresponding equipment in the stand-by state which is available.

As a measure for this problem, there is a redundant apparatus provided with the plural stand-by circuit corresponding equipments. The function of the redundant apparatus is the same as the redundant apparatus which has only one stand-by circuit corresponding equipment.

In such a prior art redundant apparatus of N+1 type which is formed of e.g. N active circuit corresponding equipments and a single stand-by circuit corresponding equipment, a diagnosis is done by providing N+1 signal systems corresponding to each circuit corresponding equipment. Namely, the main signal circuits like A0–A2 in FIG. 17 are always required for all of the circuit corresponding equipments which should be actually equipped. Therefore, in an electronic switchboard, 1/N of the hardware capacity of the switch portion always remains unused.

The diagnosis of the circuit corresponding equipment requires a function of confirming signal transmissions and receptions by an apparatus including a circuit corresponding equipment DTC in order to return the signal. For this function a hardware resource of the switch portion in the electronic switchboard has been used.

Namely, the diagnosis of the circuit corresponding equipment of the redundant apparatus of the N+1 formation requires the capacity of 1/N to be occupied in respect of hardware and transactions to be made concerning other parts than circuit corresponding equipments as subjected in respect of software.

SUMMARY OF THE INVENTION

It is accordingly an object of the present invention to provide a redundant apparatus formed of an active unit and a stand-by unit to which the active unit is switched over when a fault has occurred in the active unit, in which a waste of hardware resource (a switch portion) is removed and a diagnosis for the active unit and the stand-by unit (circuit corresponding equipment) is efficiently carried out.

[1] In order to achieve the above-mentioned object, a redundant apparatus according to the present invention comprises a connection controller which is connected to an active unit and a stand-by unit and switches over the connection, an upper unit which is connected to the active unit through the connection controller and transmits a main signal to the active unit in a normal state, and which detects a fault in the active unit and controls the connection controller to switch the faulted active unit over to the stand-by unit, and switch-over portions which are connected between a lower unit and the active units in a normal state and, under the control of the upper unit, switch the faulted active unit over to the stand-by unit which is connected to the lower unit in combination with the connection controller.

Specifically, FIG. 1 shows a schematic arrangement (1) of an electronic switchboard as a redundant apparatus according to the above-mentioned present invention. This arrangement is different from the apparatus shown in FIG. 17 in that the switch portion 120 which is included in the upper unit 100 is not connected to the circuit controller DTC, which is the connection controller, with the main signal circuit A2. Therefore, the circuit corresponding equipment DT2 as a stand-by unit is not connected to the switch portion 120 through the circuit controller DTC with the main signal circuit A2.

It is to be noted that the circuit corresponding equipments DT0 and DT1 which are active units are connected to the switch portion 120 through the circuit controller DTC with the main signals A0 and A1, like the prior art arrangement as mentioned above.

In the normal operation, different from the prior art shown in FIG. 17, the circuit controller DTC is not fixedly connected to the main signal circuits A0 and A1 but the switch portion 120 and the circuit corresponding equipments DT0, DT1 can be mutually switched over.

FIG. 2 shows a case where a fault has occurred in the circuit corresponding equipment DT0 in FIG. 1. The controller 110 which has detected a fault in the circuit corresponding equipment DT0 controls the circuit controller DTC to cut the main signal circuit A0 between the switch portion 120 and the circuit corresponding equipment DT0 and also controls the switch-over portion 300 to separate the circuit corresponding equipment DT0 from the subscriber 1.

The circuit controller DTC connects the switch portion 120 and the stand-by circuit corresponding equipment DT2 with the main signal circuit A0. The stand-by circuit corresponding equipment DT2 is connected to the subscriber 1 by the switch-over portion 300, thereby connecting the subscriber 1 and the switch portion 120 with the main signal circuit A0.

As shown in FIGS. 1 and 2, the switch portion 120 need not accommodate the main signal circuit A2. Therefore, it is made possible to reduce the hardware capacity of the switch portion 120. For instance, a redundant apparatus which has 4 active circuit corresponding equipments and a single stand-by circuit corresponding equipment can reduce the switch capacity by ¼.

[2] In the above-mentioned invention, when the active unit is restored from the fault, the connection controller may return the stand-by unit and the active unit back to the initial state so as to connect the restored active unit to the upper unit under the control of the upper unit.

As shown in FIG. 2, when the circuit corresponding equipment DT0 is restored the circuit controller DTC switches the main signal circuit A0 connected to the switch portion 120 from the stand-by circuit corresponding equipment DT2 back to the circuit corresponding equipment DT0 under the control of the controller 110, and the switch-over portion 300 switches the subscriber 1 from the circuit corresponding equipment DT2 back to the circuit corresponding equipment DT0.

[3] The above connection controller may separate the faulted active unit from the upper unit under the control of the upper unit in the absence of a stand-by unit to be switched over.

FIG. 3 shows a case where a fault has occurred in the circuit corresponding equipment DT1 in FIG. 2. The controller 110 which has detected the fault in the circuit corresponding equipment DT1 cuts the connection of the main signal circuit A1 between the circuit corresponding equipment DT1 and the switch portion 120. In this case, the stand-by circuit corresponding equipment DT2 is the only one stand-by unit and is already in the active state, so that no switchover between the circuit corresponding equipment DT1 and the circuit corresponding equipment DT2 is executed, and the subscriber 2 is unavailable.

[4] The above connection controller may switch the active unit which has a fault or has been separated over to the stand-by unit which has already been switched back for the connection to the upper unit when switching the active unit and the stand-by unit back to the initial state.

Namely, when the circuit corresponding equipment DT0 is restored to the normal state in FIG. 3, the circuit corresponding equipment DT0 and the stand-by circuit corresponding equipment DT2 are switched over, so that the circuit corresponding equipment DT0 and the circuit corresponding equipment DT2 become the active state and the stand-by state, respectively as shown in FIG. 4. At the point of switchover, the controller 110 switches the circuit corresponding equipment DT2 over to the circuit corresponding equipment DT1 to release the state where the subscriber 2 is unavailable when having recognized the circuit corresponding equipment DT1 disconnected off due to the fault.

As a result, since the circuit corresponding equipment DT0 as previously faulted has been switched over to the stand-by corresponding equipment DT2, the main signal circuit A1 connected to the corresponding equipment DT1 which is newly faulted has no stand-by circuit corresponding equipment to be switched over and so remains unavailable. As soon as the stand-by corresponding equipment DT2 is switched back, the circuit corresponding equipment DT1 and the corresponding equipment DT2 can be mutually switched over for the restoration of the main signal circuit A1.

[5] The above circuit connection controller DTC, which is the connection controller, may further comprise a diagnosis portion for diagnosing the circuit corresponding equipments DT0–DT2 which are either the active unit or the stand-by unit separated from the upper unit 100 with a test signal under the control of the upper unit and for notifying the result to the upper unit 100.

Namely, FIG. 5 shows a schematic arrangement (2) of a redundant apparatus according to the present invention. This arrangement is different from the schematic arrangement (1) of FIG. 1 in that the circuit controller DTC includes the diagnosis portion 212 which is connected to the circuit corresponding equipments DT0–DT2 and the controller 110 with the main signal circuits A0–A2 and the control signal circuit C.

As a result, the main signal circuit A2 for the test signal which is used in the prior art electronic switchboard shown in FIG. 17 is not needed, and the switch capacity of the switch portion 120 can be less than that of the prior art example.

[6] The above diagnosis portion may diagnose the stand-by unit before the switchover, and only when there is no fault in the stand-by unit the connection controller may perform the switchover.

When the fault has occurred in the circuit corresponding equipment DT0 in FIG. 5, the circuit controller DTC firstly connects the diagnosis portion 212 to the stand-by circuit corresponding equipment DT2 to diagnose the stand-by circuit corresponding equipment DT2. Only when there is no fault in the circuit corresponding equipment DT2, the circuit corresponding equipment DT0 is switched over to the circuit corresponding equipment DT2.

As a result, in the case that the stand-by circuit corresponding equipment DT2 is already faulted when a fault has occurred in the circuit corresponding equipment DT0, switching the circuit corresponding equipment DT0 over to the circuit corresponding equipment DT2 can be prevented. Especially, it is effective in the case that there is no means by which the diagnosis for the switchover function of the system is automatically executed and a maintenance person periodically diagnoses the stand-by circuit corresponding equipment DT2 in order to prevent the fault from being potential.

[7] The above diagnosis portion may be connected to the faulted active unit for the diagnosis which has been separated from the upper unit upon the switchover.

Namely, when the circuit controller DTC switches the circuit corresponding equipment DT0 as faulted over to the stand-by circuit corresponding equipment DT2 in the FIG. 5, the diagnosis portion 212 is simultaneously connected to the circuit corresponding equipment DT0. As soon as this circuit corresponding equipment DT0 is repaired and exchanged, the diagnosis can be executed to confirm the restoration.

[8] The above diagnosis portion may periodically diagnose the stand by unit under the control of the upper unit or autonomously.

In FIG. 5, the diagnosis portion 212 can periodically diagnose the stand-by circuit corresponding equipment DT2 by the instruction of the controller 110 or autonomously, and can confirm and guarantee the normality of the stand-by circuit corresponding equipment.

[9] The above diagnosis may be stopped and the faulted active unit may be switched over to the stand-by unit, when a fault has occurred in the active unit during the diagnosis.

In FIG. 5, when the fault has occurred in the circuit corresponding equipment DT0 while diagnosing the stand-by circuit corresponding equipment DT2, the diagnosis can be stopped immediately, and the circuit corresponding equipment DT0 as faulted can be switched over to the stand-by circuit correspondence unit DT2. In this case, the diagnosis result will be abandoned.

As a result, the restoration of the active circuit corresponding equipment has a priority over the diagnosis of the stand-by corresponding equipment DT0, so that the reliability of the system for the fault is enhanced.

[10] The above upper unit may classify the stand-by unit into a active state, a maintenance state, an OS (out of service) state-faulted state, a stand-by state, a diagnosis-stand-by state, or a diagnosis-maintenance state which is a kind of the active state where the stand-by unit is switched over from the active unit to diagnose the active unit in the maintenance state/(or) the OS state ("OUS") and control each state so as not to switch the faulted active unit over to the stand-by unit with the active state, the maintenance state, the OS state, or the diagnosis-maintenance state ("DIA0US").

In FIG. 5, the controller 110 classifies the circuit corresponding equipment DT2 into the active state, the maintenance state, the OS state, the stand-by state, the diagnosis-stand-by state, or the diagnosis-maintenance state which is a kind of the active state switched over from the circuit corresponding equipment DT0 or DT1 to be diagnosed with the maintenance state or the OS state, each of the states being managed.

Even if the fault occurs newly in the circuit corresponding equipment DT0 or DT1 when the circuit corresponding equipment DT2 is in the active state, the OS state or the diagnosis-maintenance state, the switchover from these circuit corresponding equipments DT0 and DT1 to the circuit corresponding equipment DT2 is not executed.

As a result, the controller 110 stores the latest diagnosis result and the state of each circuit corresponding equipment. Therefore, referring to the stored state, the controller 110 can immediately decide whether or not switching the faulted active unit over to the stand-by circuit corresponding equipment DT2 should be executed.

[11] In the above-mentioned invention [10], it is also possible for the upper unit not to periodically diagnose the stand-by unit which is in the active state, the maintenance state or the OS state.

In FIG. 5, when the stand-by circuit corresponding equipment DT2 is in the maintenance state or the OS state or the active state after having been switched over from the circuit corresponding equipment DT0 for example, the controller 110 transmits no instruction by which the stand-by circuit corresponding equipment DT2 is periodically diagnosed.

As a result, the periodical diagnosis is prohibited to the circuit corresponding equipment DT2, to which it can not be executed nor need not be executed.

[12] The above the upper unit may classify the active unit into the active state, the maintenance state, or the OS state and if there is no stand-by unit to be switched over, it is possible for the upper unit to separate the faulted active unit from the upper unit to put it into the OS state, and to switch the active unit over to the stand-by unit which is in the stand-by state, or the diagnosis-stand-by state before the restoration of the active unit which is in the OS state.

In FIG. 5, when the upper unit 100 classifies the circuit corresponding equipment DT0 and DT1 into the active state, the maintenance state, the OS state, and manages each state, and when there is the circuit corresponding equipment DT1 of the OS state which is separated from the circuit A1, and when the circuit corresponding equipment DT0 of the OS state is restored which has been switched over to the circuit corresponding equipment DT2 before the restoration of the circuit corresponding equipment DT1, the circuit corresponding equipment DT2 is switched back to the stand-by state or the diagnosis-stand-by state. In this state, the circuit corresponding equipment DT2 can be switched over to the circuit corresponding equipment DT1 as faulted.

[13] The above upper unit may connect the active unit which is in the maintenance state to the diagnosis portion for the diagnosis.

In FIG. 5, in order to maintain the circuit corresponding equipment DT0 the controller 110 separates the equipment DT0 from the circuit A0 after having set the circuit corresponding equipment DT0 to the maintenance state. At this time, because the circuit corresponding equipment DT0 is not in the maintenance state due to a fault, switching the circuit corresponding equipment DT0 over to the circuit corresponding equipment DT2 is not executed. The controller 110 connects the circuit corresponding equipment DT0 to diagnosis portion 212 for the execution of the diagnosis.

[14] In the above-mentioned invention [10], when the diagnosis portion is not connected to the active unit or the stand-by unit of the maintenance state or the OS state to be diagnosed, and when the stand-by unit is in the active state or the diagnosis-maintenance state, the upper unit may not connect the diagnosis portion to the active unit or the stand-by unit to be diagnosed.

In FIG. 5, when the diagnosis portion 212 is not connected to the circuit corresponding equipments DT0–DT2 to be diagnosed as to whether they are in the maintenance state or the OS state, and when the state of the circuit corresponding equipment DT2 is in the active state or the diagnosis-maintenance state, the controller 110 does not connect the circuit corresponding equipments DT0–DT2 to the diagnosis portion 212 and does not execute the diagnosis.

As a result, if the diagnosis portion 212 is not provided as being connectable for the diagnosis, the controller 110 gives no instruction of the diagnosis execution to the diagnosis portion 212, so that the diagnosis will not be executed.

[15] The above upper unit may switch the faulted active unit over to the stand-by unit in the diagnosis-maintenance state after having stopped the diagnosis for the active unit.

In FIG. 5, when the circuit corresponding equipment DT0 is switched over to the stand-by circuit corresponding equipment DT2 to maintain the circuit corresponding equipment DT0, the state of the circuit corresponding equipment DT2 is set to the diagnosis-maintenance state. At this time, if the circuit corresponding equipment DT1 is faulted and turns to the OS state, the controller 110 releases the connection of the circuit A0 to the circuit corresponding equipment DT2 and switches the latter over to the circuit corresponding equipment DT1.

[16] The above upper unit may execute the switchover after the diagnosis instead of stopping the diagnosis for the active unit.

When the diagnosis of the circuit corresponding equipment DT0 for the maintenance is finished and the state of the circuit corresponding equipment DT2 is no longer the diagnosis/maintenance state, the controller 110 releases the connection of the circuit A0 to the circuit corresponding equipment DT2 and switches the latter over to the circuit corresponding equipment DT1.

[17] In the above-mentioned inventions [1]–[16], it is possible to have plural active units and stand-by units.

In the schematic arrangement in FIG. 1–5, there is two active units while it is possible to have only one or more than three active units. Also, there is only one stand-by unit while it is possible to have more than two stand-by units.

[18] The above diagnosis portion may sequentially diagnose the plural stand-by units which are separated.

If there are two or more stand-by circuit corresponding equipments, it becomes possible to sequentially connect a single diagnosis portion to the stand-by units in the stand-by state for the execution of the diagnosis, thereby confirming and guaranteeing the normality of the stand-by circuit corresponding equipments.

Accordingly, the number of the diagnosis portions in the entire system is reduced and the cost is effectively kept lower.

[19] In the above-mentioned invention [17], the same number of diagnosis portions may be provided as the stand-by units are diagnosed.

Diagnosis portions each corresponding to the stand-by units are provided, and each diagnosis portion is connected to each stand-by unit for the execution of the diagnosis, and for the confirmation of normality.

As a result, different from the case where there is only one diagnosis portion, each diagnosis portion can execute its diagnosis without switching each stand-by unit, so that the reliability of the diagnosis is improved.

[20] The above upper unit may be formed of the switch portion and the controller. The connection controller may be a circuit controller, and the active unit and the stand-by unit may be circuit corresponding equipments and the lower unit may be a subscriber's terminal equipment.

As already shown in the schematic arrangements of FIGS. 1–5, the redundant apparatus according to the present invention can be applied to an electronic switchboard.

[21] In order to achieve above-mentioned object, a redundant apparatus according to the present invention may comprise a connection controller which is connected to an active unit and a stand-by unit and switches over the connection, and an upper unit which is normally connected to the active unit through the connection controller and transmits a main signal to the active unit and which detects a fault in the active unit and controls the connection controller to switch the faulted active unit over to the stand-by unit.

Specifically, FIG. 6 shows the schematic arrangement (3) of the redundant apparatus according to the present invention. While FIG. 1 shows the schematic arrangement of an electronic switchboard, the schematic arrangement (3) schematically shows a general information processor.

In FIG. 6, the switch-over portion 300 and the subscribers 1 and 2 connected under the circuit corresponding equipments DT0–DT2 shown in FIG. 5 are excluded. The circuit corresponding equipments DT0 and DT1, the stand-by circuit corresponding equipment DT2, and the circuit controller DTC are the active unit 220, 221,and the stand by unit 222, and the connection controller 210, respectively.

As a result, the upper unit does not have to include the switch portion which switches the active unit over to the stand by unit, thereby reducing the cost.

[22] The above connection controller may be provided with a diagnosis portion which diagnoses the active unit or the stand-by unit which is separated from the upper unit under the control of the upper unit by using a test signal and notifies the result to the upper unit.

As a result, the upper unit does not have to include the switch portion which switch the active unit and the stand-by unit over to the diagnosis portion, thereby reducing the cost.

BRIEF DESCRIPTION OF THE DRAWINGS

Throughout the figures, like reference numerals indicate like or corresponding components.

DESCRIPTION OF THE EMBODIMENTS

Figure 1:
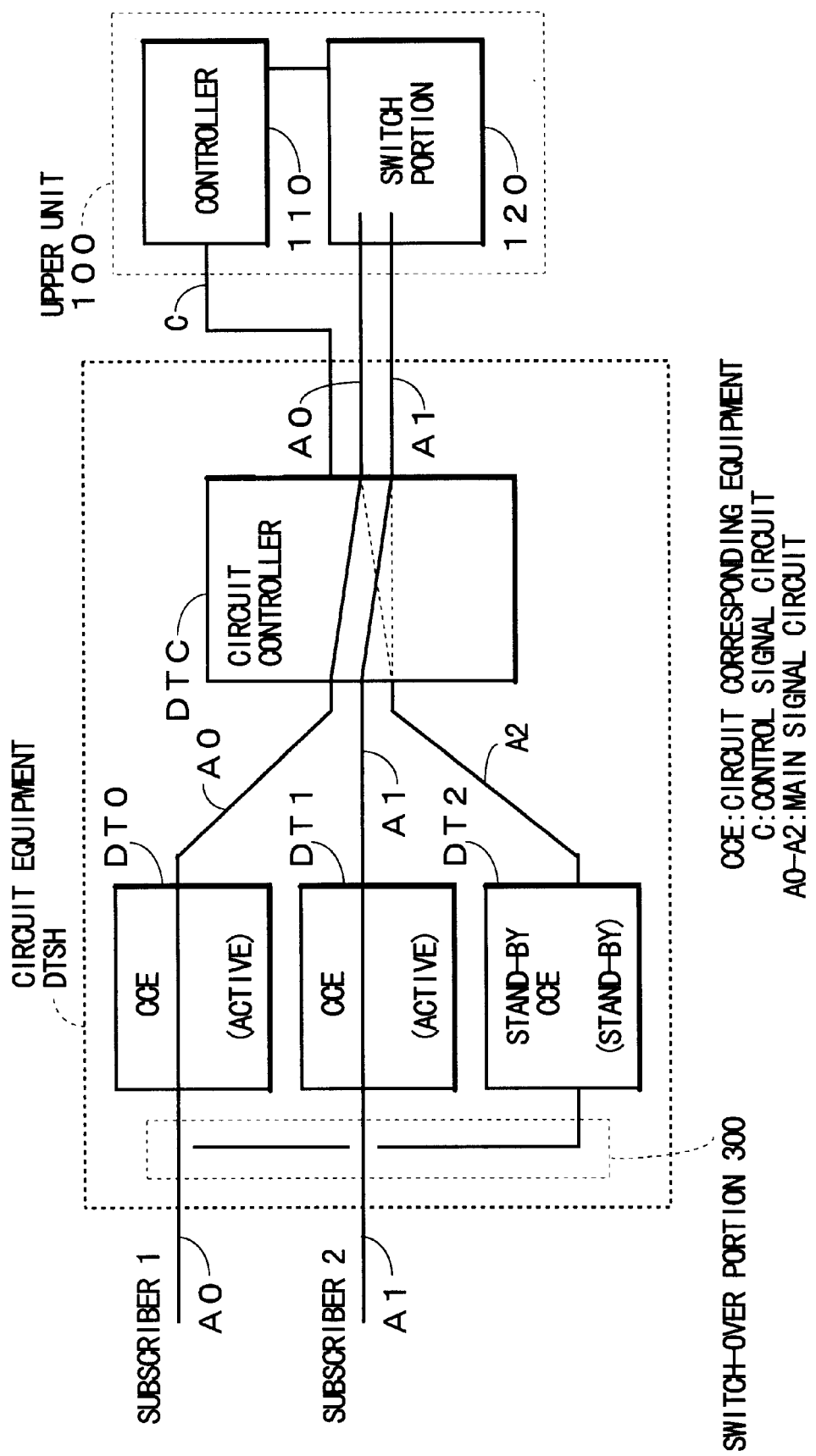
FIG. 1 is a block diagram showing a schematic arrangement (1) of a redundant apparatus according to the present invention.
Figure 2:
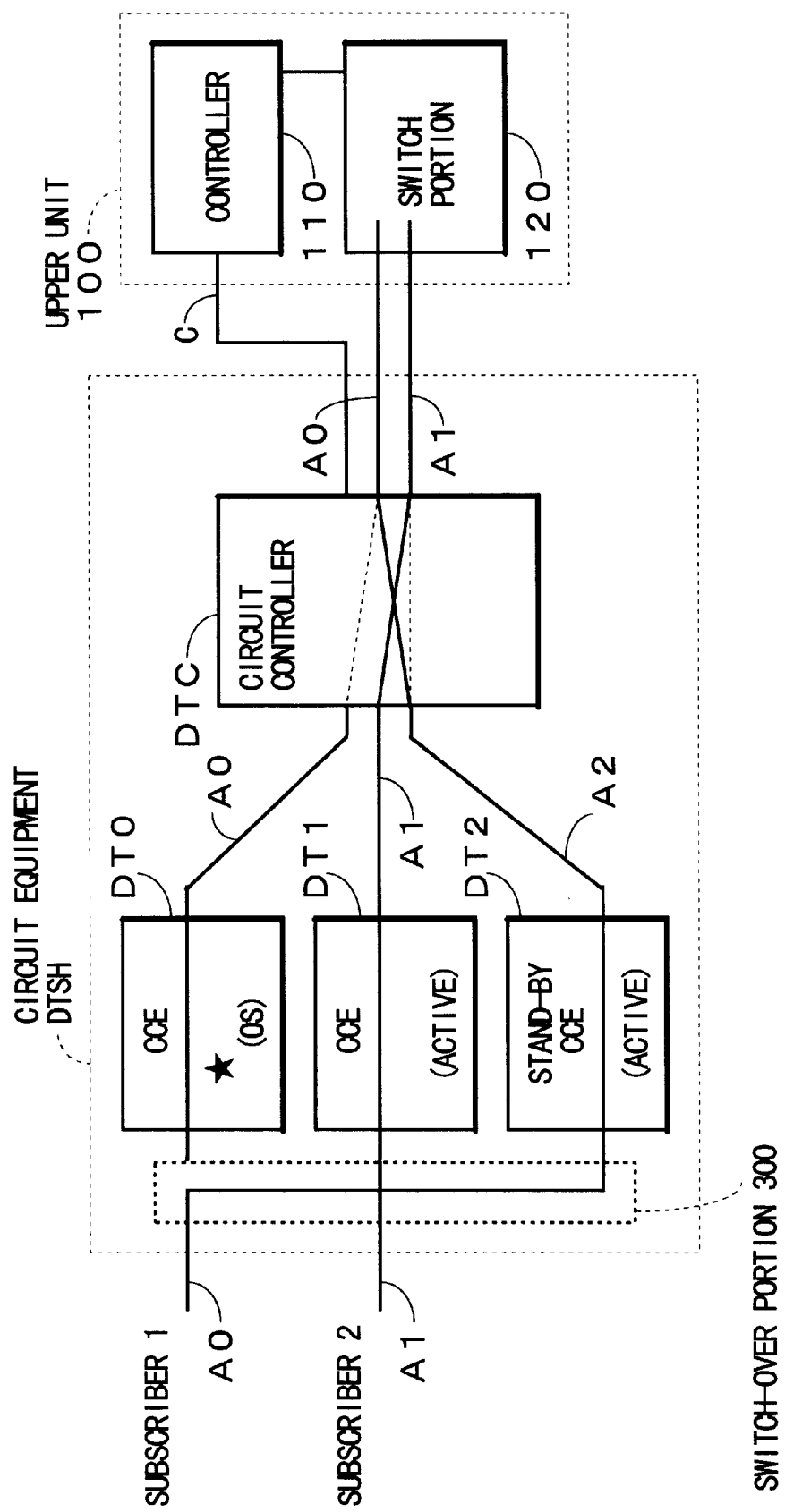
FIG. 2 is a block diagram showing a state of the apparatus when a fault occurs in the schematic arrangement (1) of FIG. 1.
Figure 3:
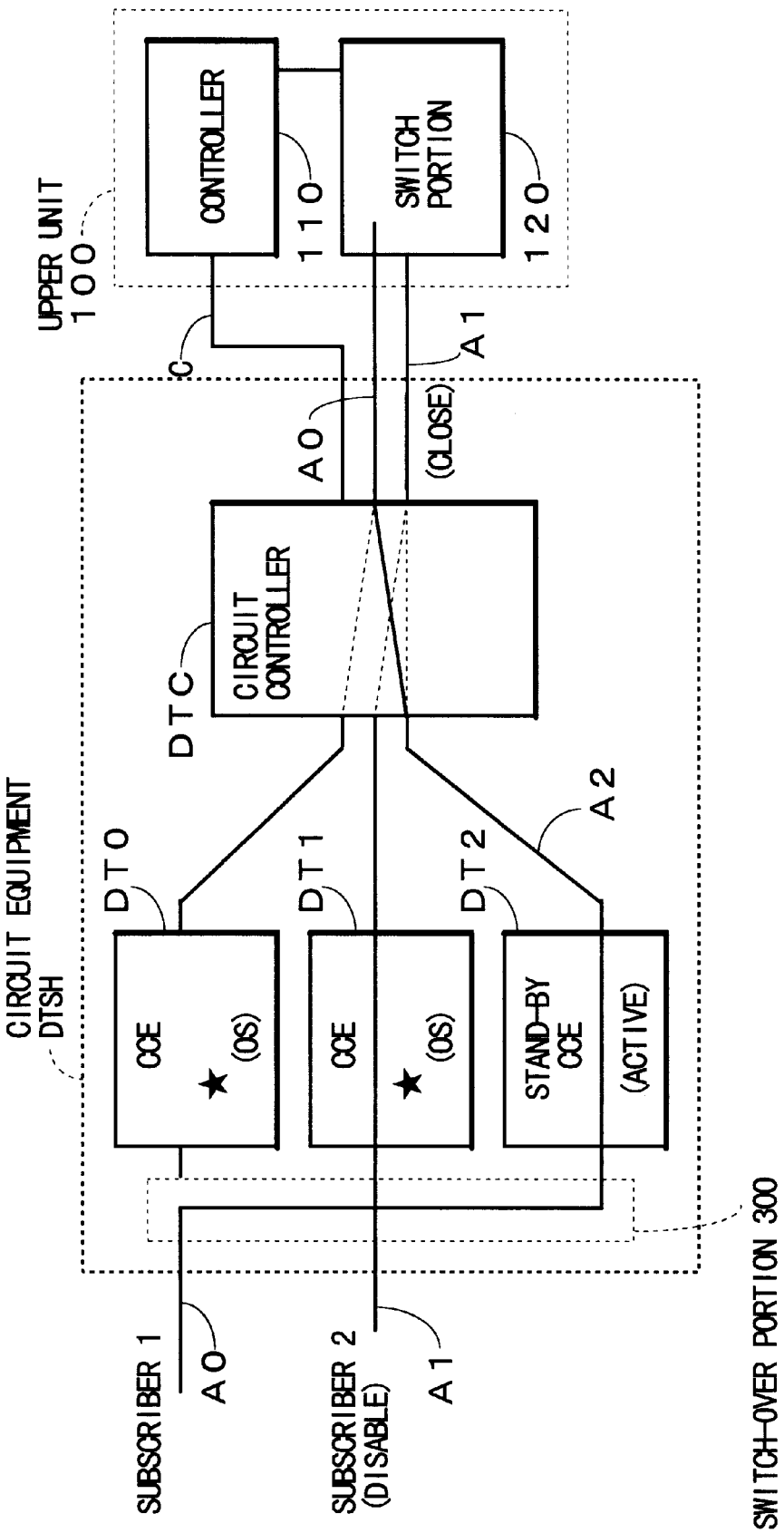
FIG. 3 is a block diagram showing a state of the apparatus (2) when a fault occurs in the schematic arrangement (1) of FIG. 1.
Figure 4:
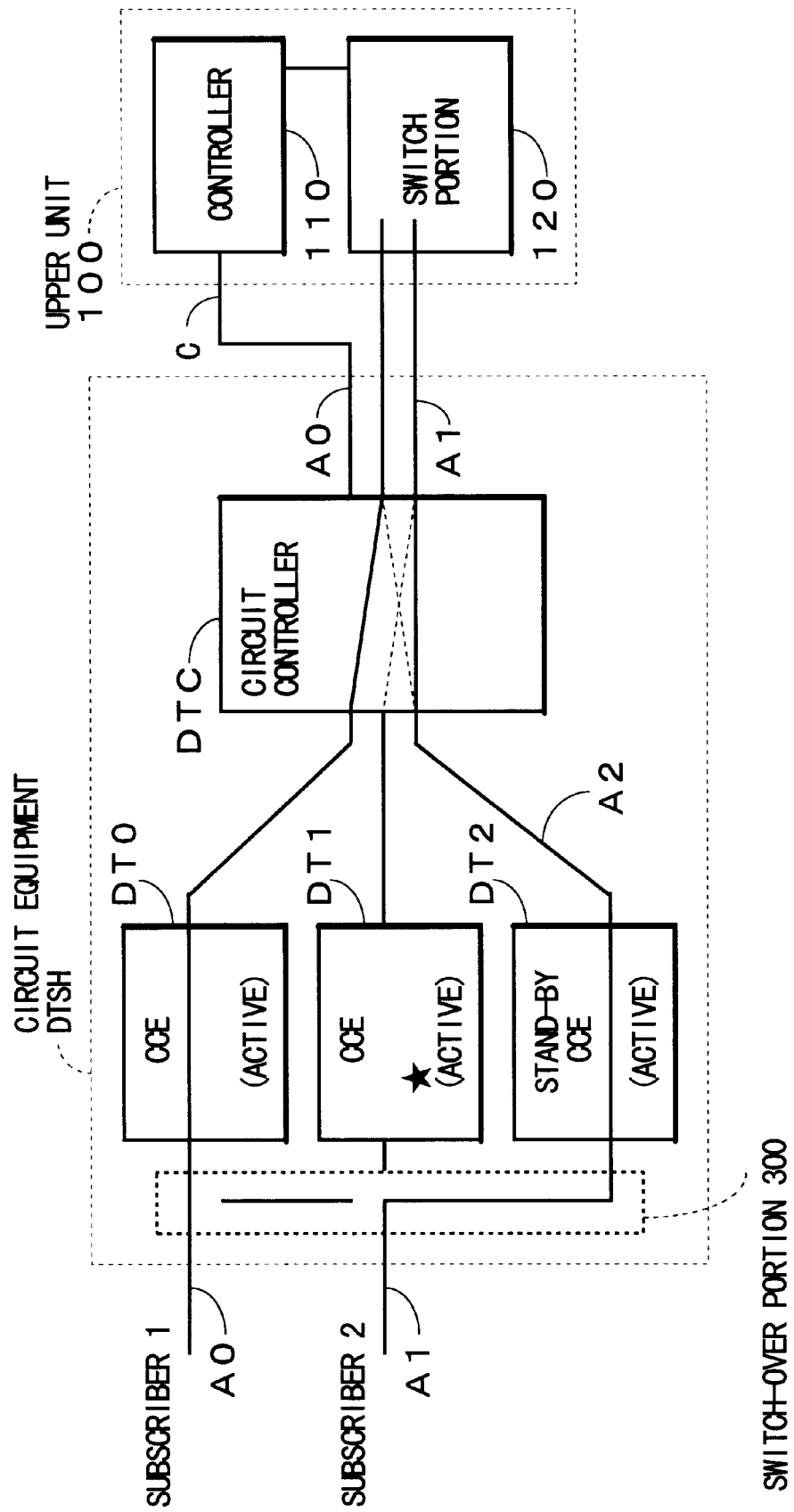
FIG. 4 is a block diagram showing a state of the apparatus (3) when a fault occurs in the schematic arrangement (1) of FIG. 1.
Figure 5:
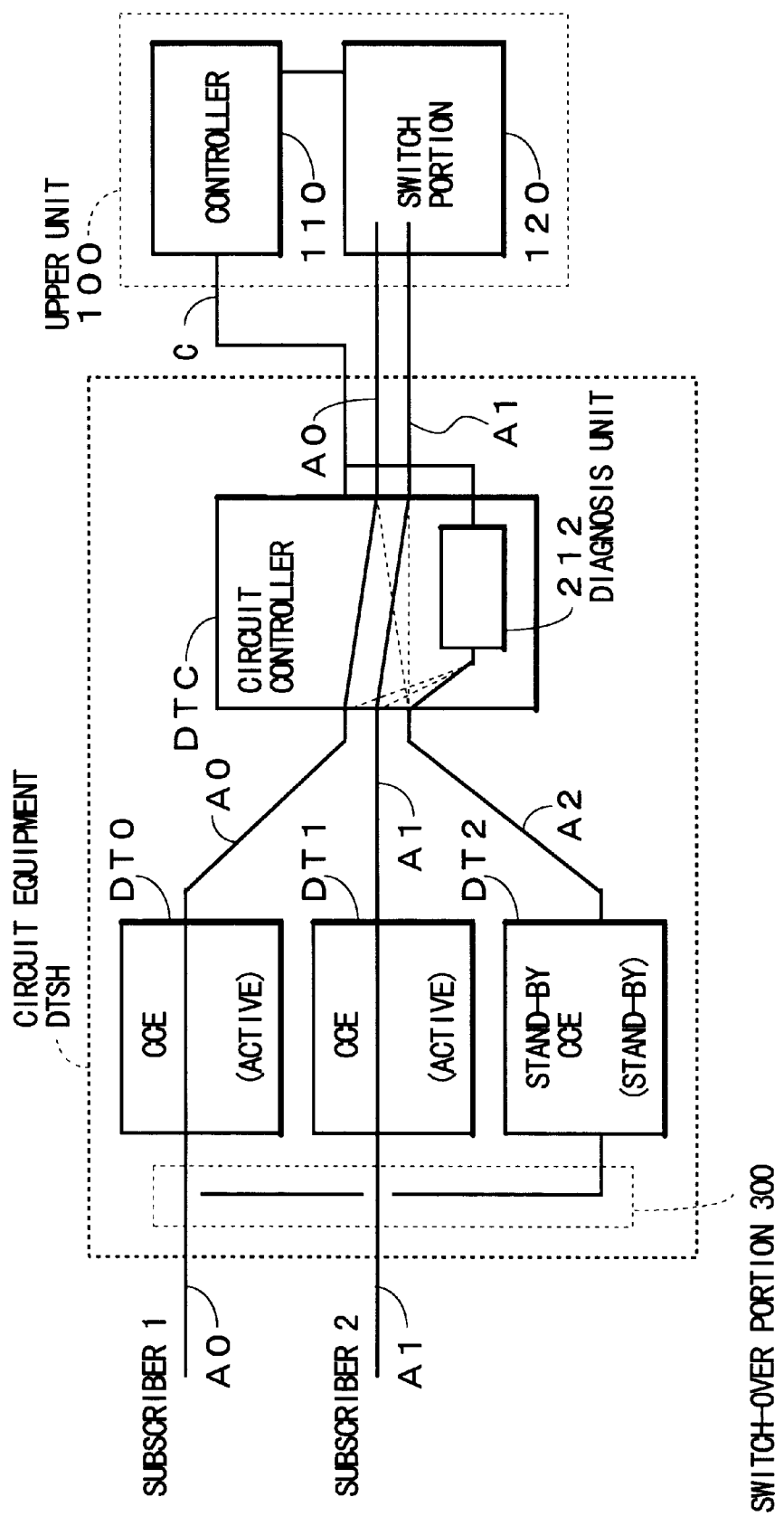
FIG. 5 is a block diagram showing a schematic arrangement (2) of a redundant apparatus according to the present invention.
Figure 6:
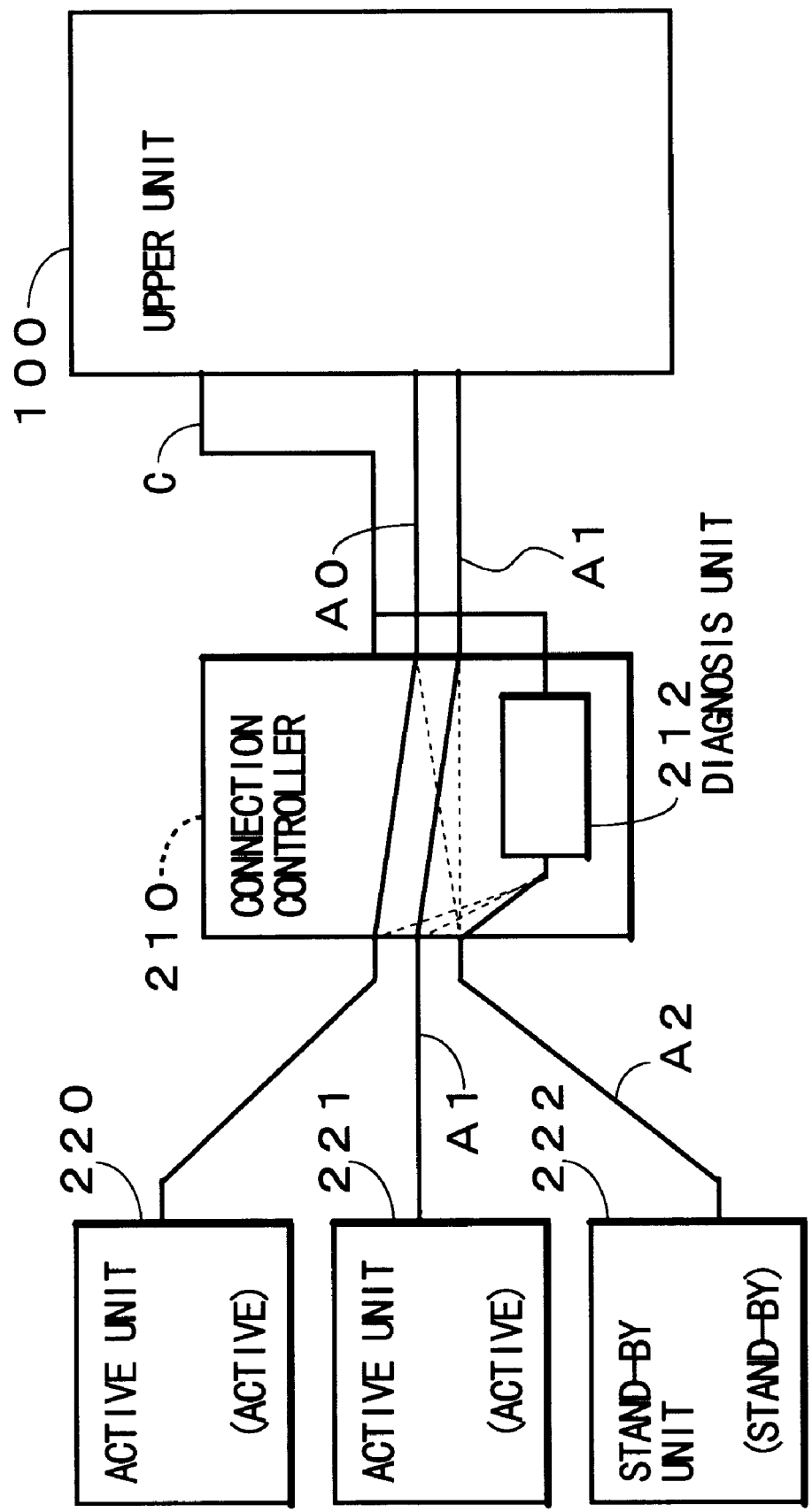
FIG. 6 is a block diagram showing a schematic arrangement (3) of a redundant apparatus according to the present invention.
Figure 7:
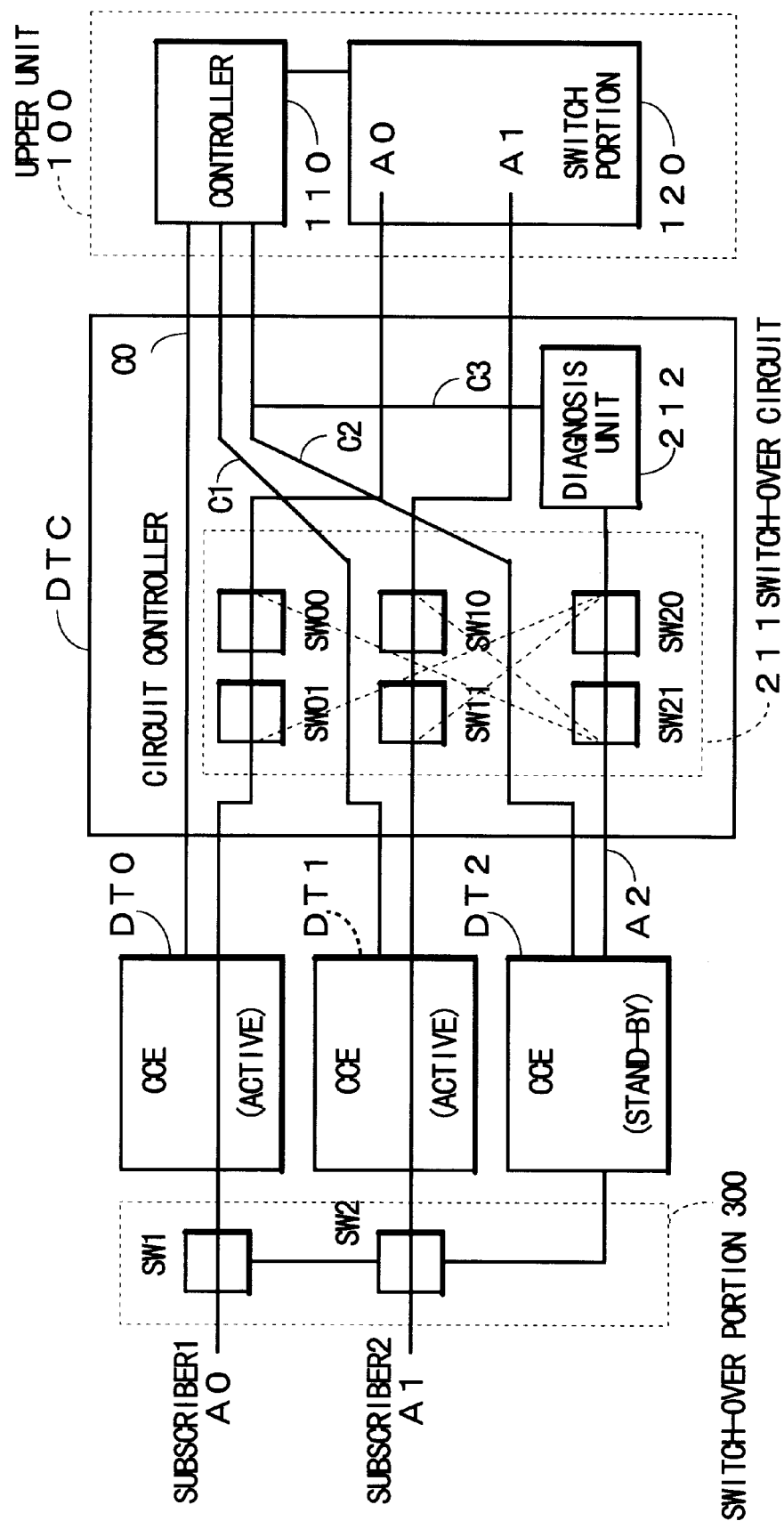
FIG. 7 is a block diagram showing an embodiment (1) of a redundant apparatus according to the present invention.

FIG. 7 shows an embodiment (1) of an electronic switchboard which is an example of a redundant apparatus according to the present invention. In this embodiment (1), the switch-over portion 300 and the circuit controller DTC shown in the schematic arrangement (2) in FIG. 5 are illustrated more specifically.

The circuit controller DTC is formed of a switch circuit 211 and the diagnosis portion 212. The switch circuit 211 is formed of switches SW01–SW20, and the switch-over portion 300 is formed of switches SW1 and SW2.

The circuit corresponding equipments DT0–DT2 and the diagnosis portion 212 are connected to the controller 110 with the control signal circuits C0–C3, respectively. The diagnosis portion 212 and the circuit corresponding equipment DT2 are mutually connected with a main signal circuit A2 through the switches SW21 and SW20. Also, the circuit corresponding equipment DT2 is connected to the switches SW1 and SW2.

The subscriber 1 and the switch portion 120 are mutually connected with the main signal circuit A0 through the switch SW1, the circuit corresponding equipment DT0, and the switches SW01, SW00. The subscriber 2 and the switch portion 120 are mutually connected with the main signal circuit A1 through the switch SW2, the circuit corresponding equipment DT1, and the switches SW11, SW10.

In a normal operation, the circuit corresponding equipments DT0 and DT1 are set to the active state and serve as active units. The circuit corresponding equipment DT2 is set to the stand-by state and serve as a stand-by unit. The subscribers 1 and 2 are connected to the switch portion 120 with the main signal circuits A0 and A1, respectively.

Figure 8:
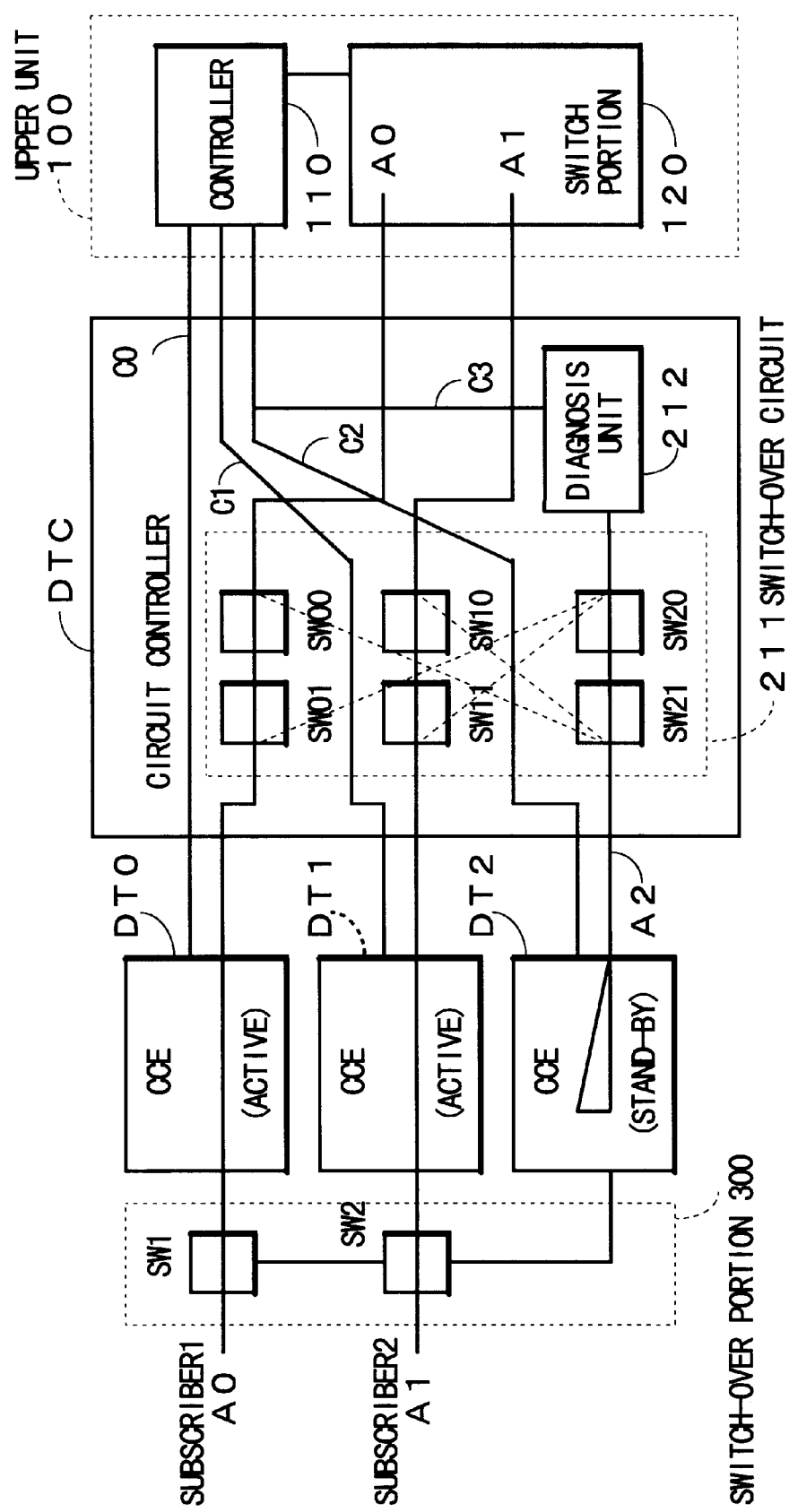
FIG. 8 is a block diagram showing a diagnosis example (1) in the embodiment (1)

FIG. 8 shows a diagnosis example (1) of the stand-by circuit corresponding equipment DT2 in the embodiment (1) shown in FIG. 7.

The controller 110 sends a signal instructing a diagnosis to the control signal circuit C3. Receiving this signal, the diagnosis portion 212 sends a test signal to the circuit corresponding equipment DT2 through the main signal circuit A2, and receives a response signal from the circuit corresponding equipment DT2 to the test signal.

The diagnosis portion 212 decides whether the circuit corresponding equipment DT2 is normal or abnormal by that response signal and returns an alarm information, which is the result of the diagnosis, to the controller 110 through the control signal circuit C3. Receiving this alarm information, the controller 110 will perform transactions which correspond to the alarm information.

In this case, the switch portion 120 requires no switch capacity because the alarm information is sent to the controller 110 without the switch portion 120.

Figure 9:
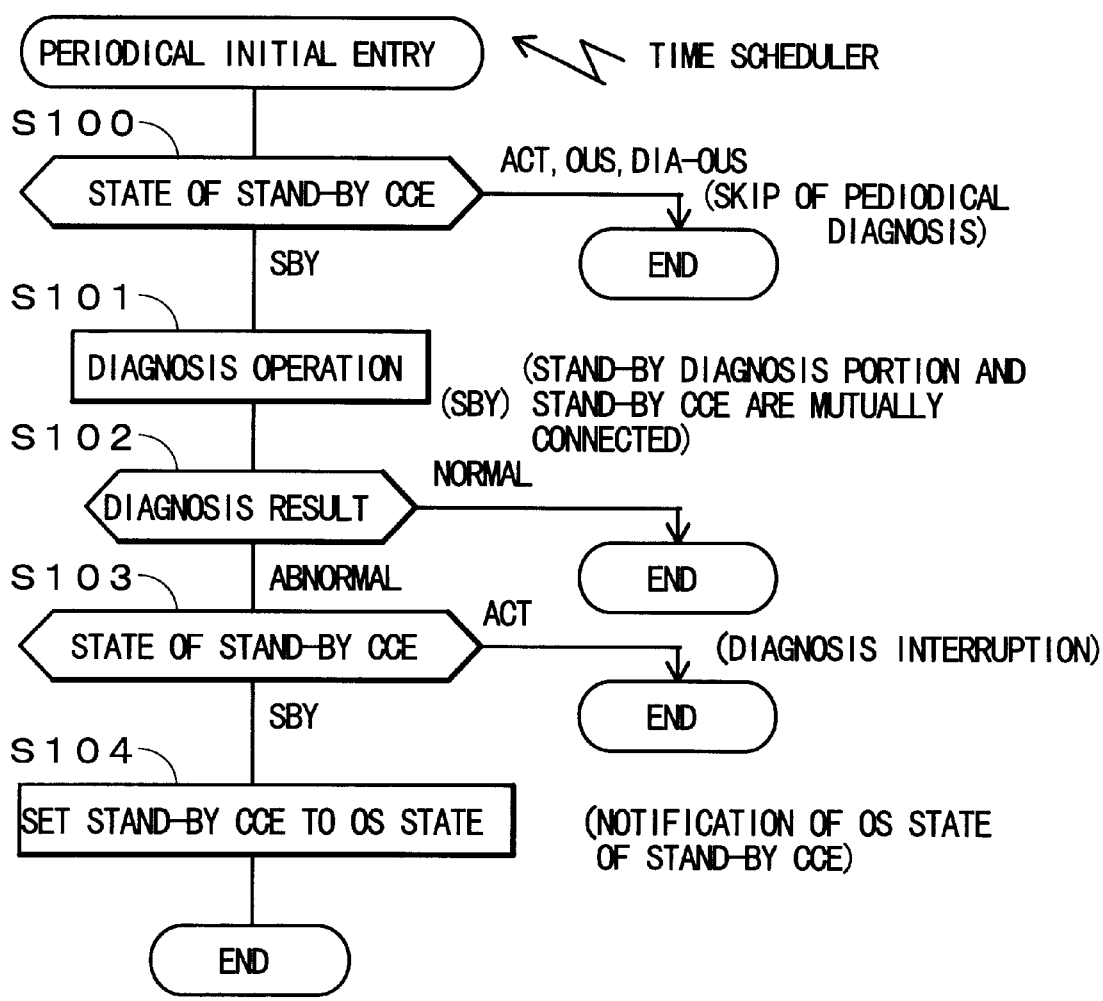
FIG. 9 is a flow chart showing an operation procedure of the diagnosis example (1)

FIG. 9 shows a periodically diagnosis example of the stand-by circuit corresponding equipment DT2 shown in FIG. 8. The diagnosis portion 212 starts the periodical diagnosis of the stand-by circuit corresponding equipment DT2 under the instruction of a time scheduler which is held inside the diagnosis portion 212 or the controller 110.

At step S100, the diagnosis portion 212 finish the further executions without executing the periodical diagnosis if the state of the stand-by circuit corresponding equipment DT2 is active "ACT", maintenance/out of service (OS) "OUS", or diagnosis-out of service "DIA-OUS". If the state of the circuit corresponding equipment DT2 is stand by "SBY", the diagnosis is executed at step 8101.

At step S102, the diagnosis portion 212 finishes the further execution if the diagnosis result is "normal" while if the diagnosis result is "abnormal", checking again the state of the stand-by circuit corresponding equipment DT2.

If the state of the circuit corresponding equipment DT2 is "ACT", the diagnosis is interrupted and the further execution is finished. This is executed in such a case that a fault occurs in e.g. the circuit corresponding equipment DT0

(steps S102 and S103) which is switched over to the circuit corresponding equipment DT2 which now becomes an active state.

On the other hand, if the stand-by circuit corresponding equipment DT2 is "SBY", the diagnosis portion 212 deems the state of the circuit corresponding equipment DT0 as "OUS". Then the diagnosis portion 212 notifies the controller 110 that the circuit corresponding equipment DT2 is "OUS" and finishes the further execution.

As a result, the stand-by circuit corresponding equipment DT2 will periodically have the diagnosis of the operation. Therefore, the reliability to the operation of the stand-by circuit corresponding equipment DT2 upon the switchover to the circuit corresponding equipment as faulted can be enhanced.

Figure 10:
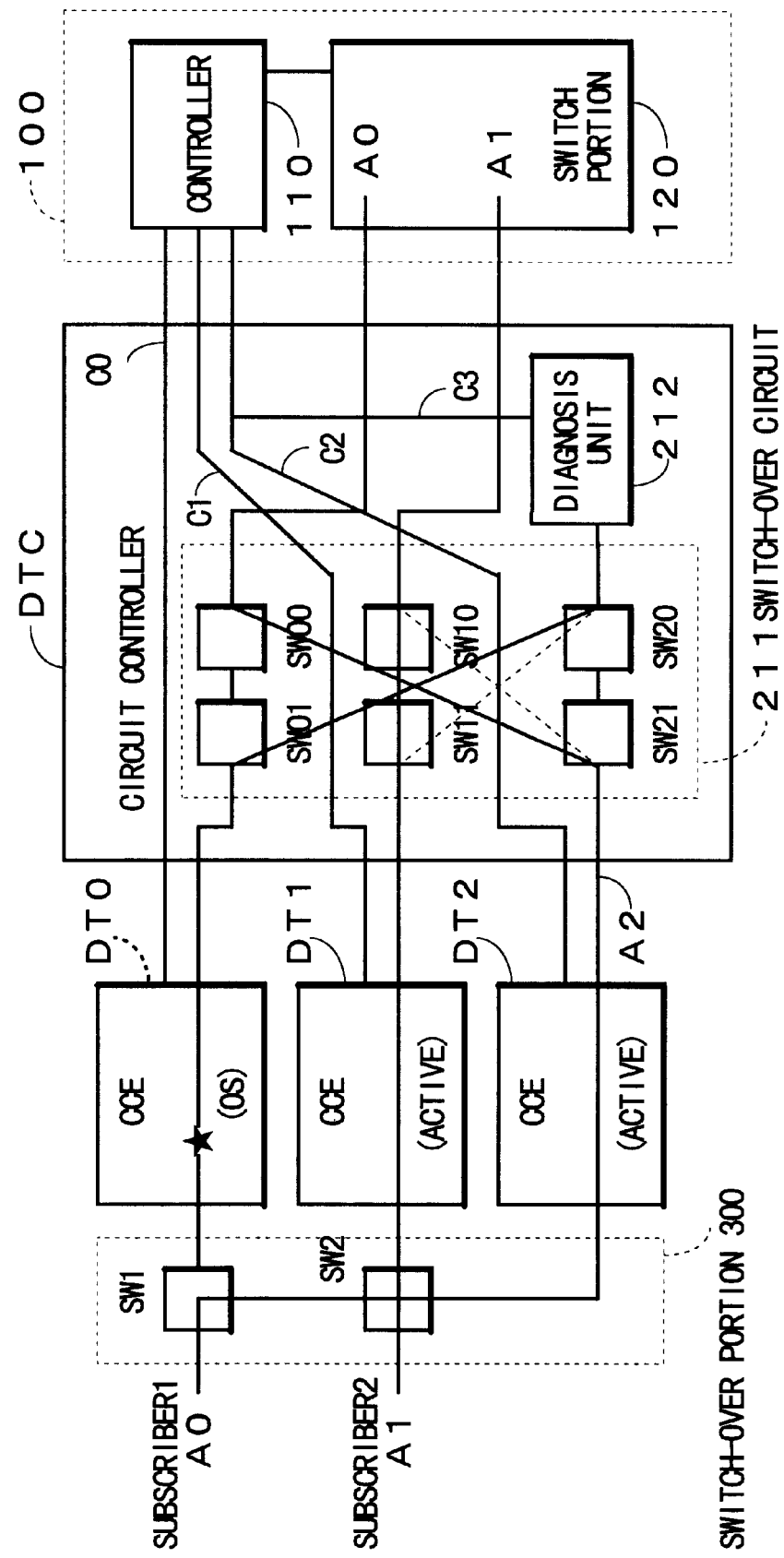
FIG. 10 is a block diagram showing a switchover operation in the embodiment (1)
Figure 11:
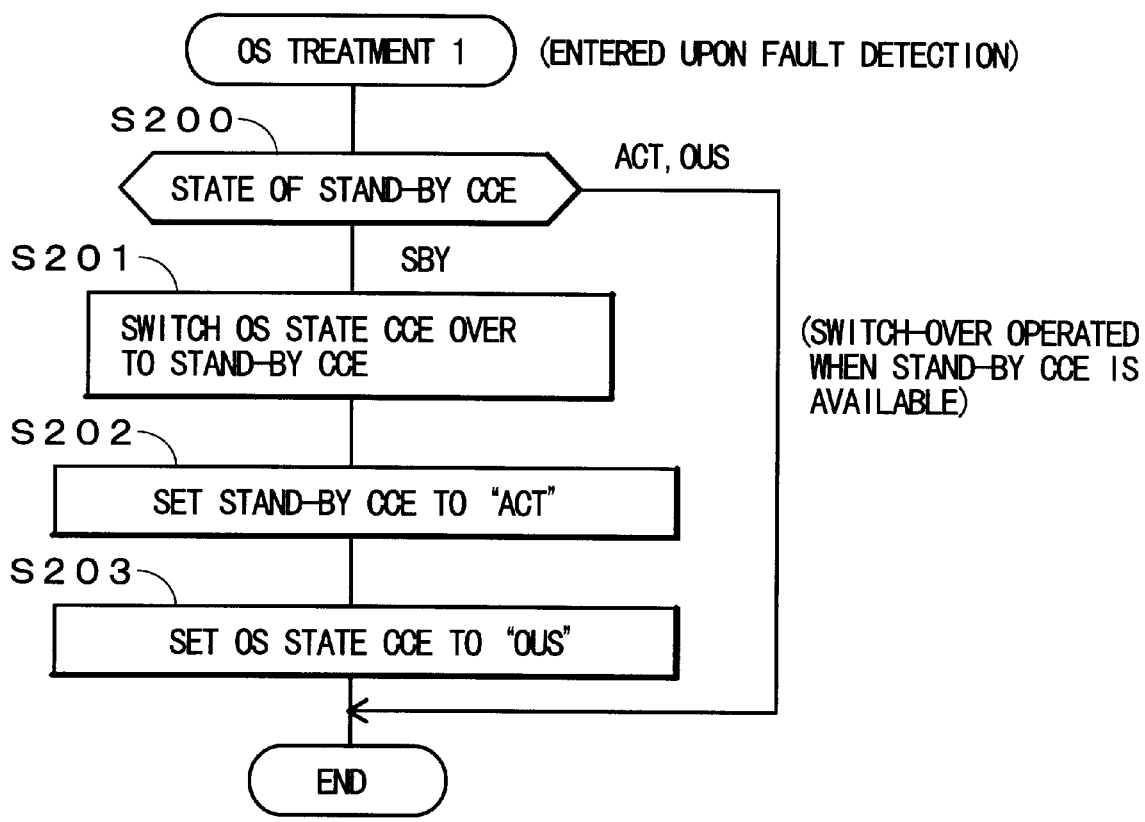
FIG. 11 is a flow chart showing a procedure of a switchover operation of the apparatus.

FIG. 10 shows an operation when the fault has occurred in the circuit corresponding equipment DT0 in the embodiment (1) of FIG. 7. This operation is described referring to the flow chart of FIG. 11.

When a fault is detected in the circuit corresponding equipment DT0 by the control signal circuit C0, the controller 110 starts an OS treatment 1 and confirms the state of the stand-by circuit corresponding equipment DT2 at step S200.

When the stand-by circuit corresponding equipment DT2 has "ACT" or "OUS" state, the further execution is finished. When the state is "SBY", the circuit corresponding equipment DT2 are switched over to the circuit corresponding equipment DT0 as faulted or in the OS state at step S201.

The controller 110 sends the instruction of switchover between the circuit corresponding equipment DT0 and the corresponding equipment DT2 to the circuit controller DTC. The circuit controller DTC cuts the main signal circuit A0 with the switches SW00, SW01 and SW1, and cuts the main signal circuit A2 with the switches SW20 and SW21 in the switch circuit 211and switch-over portion 300.

Then, the circuit controller DTC connects the circuit corresponding equipment DT2 to the subscriber 1 with the switch SW1 and connects the switches SW00 and SW20 to the switches SW21 and SW01, respectively in the switch circuit 211 and the switch-over portion 300. Also, the controller 110 sets the circuit corresponding equipments DT2 and DT0 to the active state and the OS state, respectively at steps S202 and S203.

Thus, the subscriber 1 and the switch portion 120 will be connected with the main signal circuit A0 through the switch SW1 and the stand-by circuit corresponding equipment DT2 and switch SW21 and SW00. Moreover, the circuit corresponding equipment DT0 and the diagnosis portion 212 will be connected through the switch SW01 and SW20.

As a result, the switch portion 120 need not set the passage of the circuit again, because the subscriber 1 and the switch portion 120 are operated in the same main signal circuit A0 as the signal used before the fault has occurred. The test signal need not be sent through the switch portion 120 and no switch capacity therefor is required.

Figure 12:
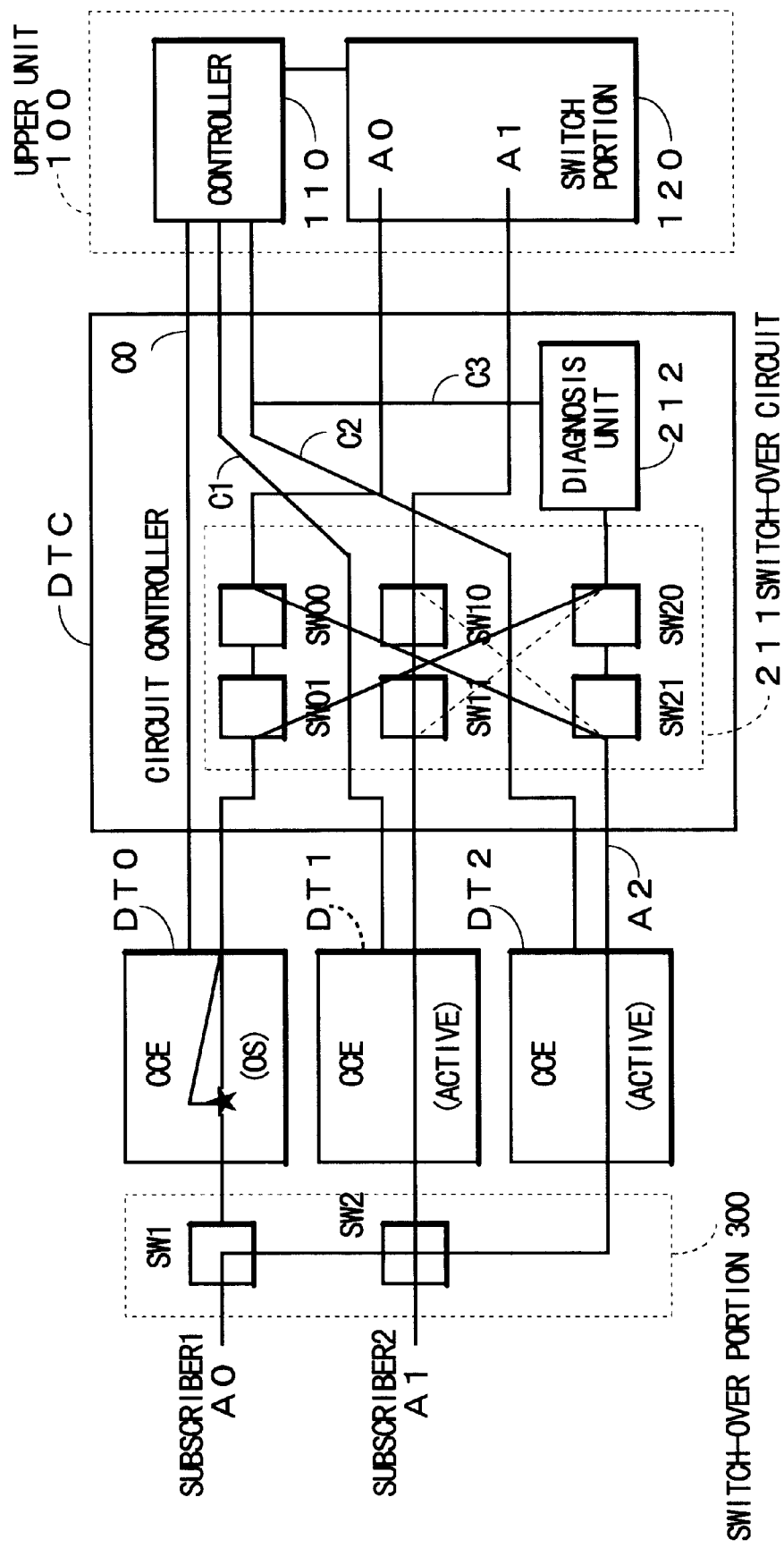
FIG. 12 is a block diagram showing a diagnosis example (2) in the embodiment (1)
Figure 13:
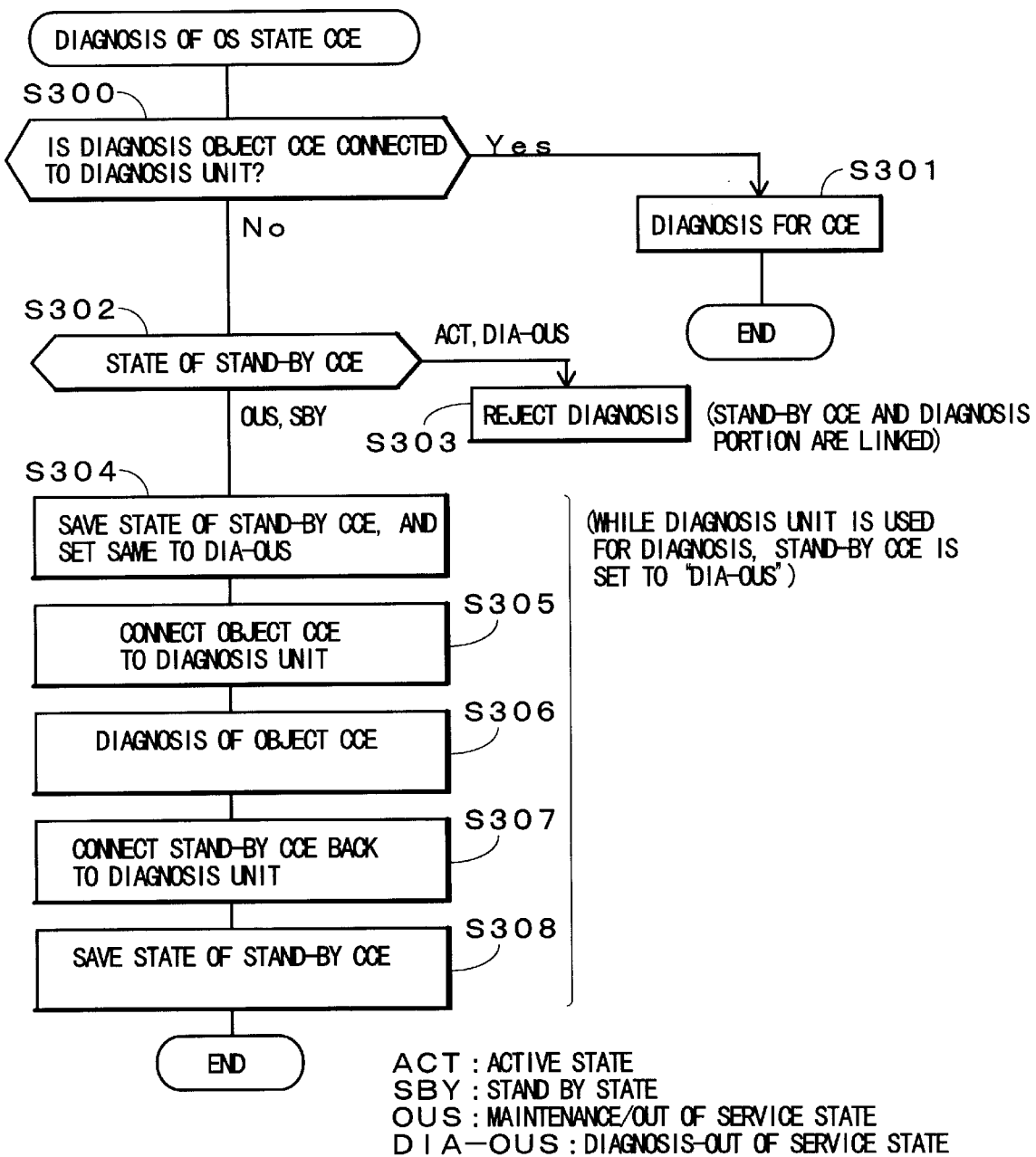
FIG. 13 is a flow chart showing an operation procedure of the diagnosis example (2)

FIG. 12 shows a diagnosis example (2) of the circuit corresponding equipment where a fault has occurred in FIG. 10. The operation procedure of this diagnosis will be described hereinafter referring to the flow chart of FIG. 13.

The controller 110 confirms whether or not the circuit corresponding equipment DT0 which is an object of the diagnosis is connected to the diagnosis portion 212 at step S300. If the circuit corresponding equipment DT0 is connected, the diagnosis portion 212 executes the diagnosis of the circuit corresponding equipment DT0 and finishes the further execution (step S301).

If the circuit corresponding equipment DT0 is not connected, the diagnosis portion 212 confirms the state of the circuit corresponding equipment DT2. If the state of the circuit corresponding equipment DT2 is "ACT" or "DIA-OUS", the diagnosis is refused at step S303. This is because the stand-by corresponding equipment DT2 and the diagnosis portion 212 synchronize with each other, and because that the state of the stand-by corresponding equipment DT2 is "ACT" or "DIA-OUS" means that the diagnosis portion 212 is being used.

If the state of the stand-by circuit corresponding equipment DT2 is found as "OUS" or "SBY" at step S302, the state of the stand-by circuit corresponding equipment DT2 is saved and then set to "DIA-OUS" at step S304.

The controller 110 connects the diagnosis portion 212 to the circuit corresponding equipment DT0 which is an object of the diagnosis at this moment at step S305. The diagnosis portion 212 executes the diagnosis of the connected circuit corresponding equipment DT0 at step S306. When the restoration of the circuit corresponding equipment DT0 is confirmed after the diagnosis, the controller 110 connects the diagnosis portion 212 back to the circuit corresponding equipment DT2 at step S307 and the state of the stand-by circuit corresponding equipment DT2 is restored to the original state as saved at step S308.

In this diagnosis example (2), no switch resource of the switch portion 120 is required like the diagnosis example (1) in FIG. 8.

Figure 14:
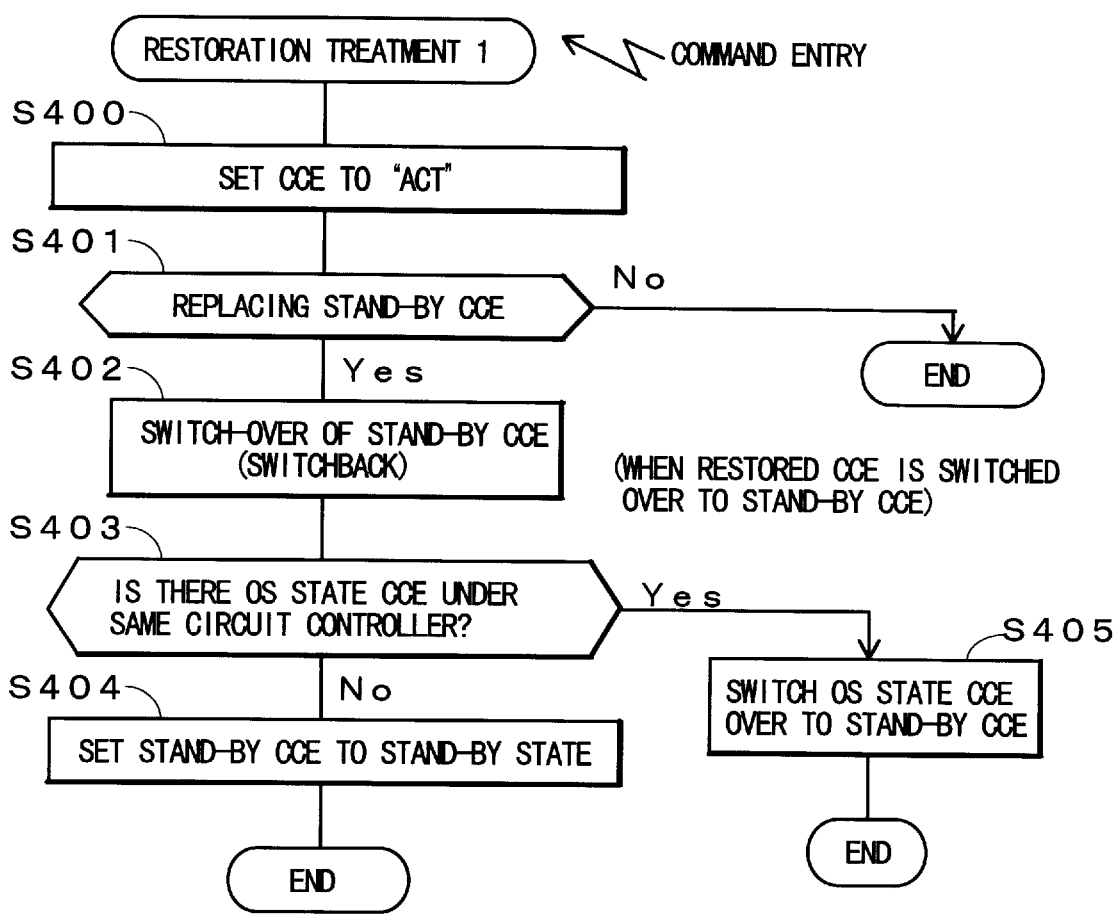
FIG. 14 is a flow chart showing an embodiment (2) of a redundancy arrangement according to the present invention.

FIG. 14 shows an embodiment (2) of the present invention, in which an operation procedure is illustrated when the circuit corresponding equipment DT0 is restored from the OS state, for instance, in FIG. 10.

The controller 110 starts the restoration treatment by receiving a command. After having set the circuit corresponding equipment DT0 to the active state at step S400, the controller 110 confirms whether or not the circuit corresponding equipment DT2 and DT0 are being switched over or replaced at step S401. If it is not the case, the further execution is finished. If it is the case, the circuit corresponding equipments DT2 and DT0 are switched back to the connection shown in FIG. 7.

In addition, the controller 110 confirms whether or not there is a circuit corresponding equipment in the OS state under the same circuit controller (step S403). If it is not the case, the stand-by circuit corresponding equipment DT0 is set to the stand-by state and the further execution is finished at step S404. If it is the case for e.g. the circuit corresponding equipment DT1, the controller 110 switches the circuit corresponding equipment DT1 over to the circuit corresponding equipment DT2 at step S405.

Figure 15:
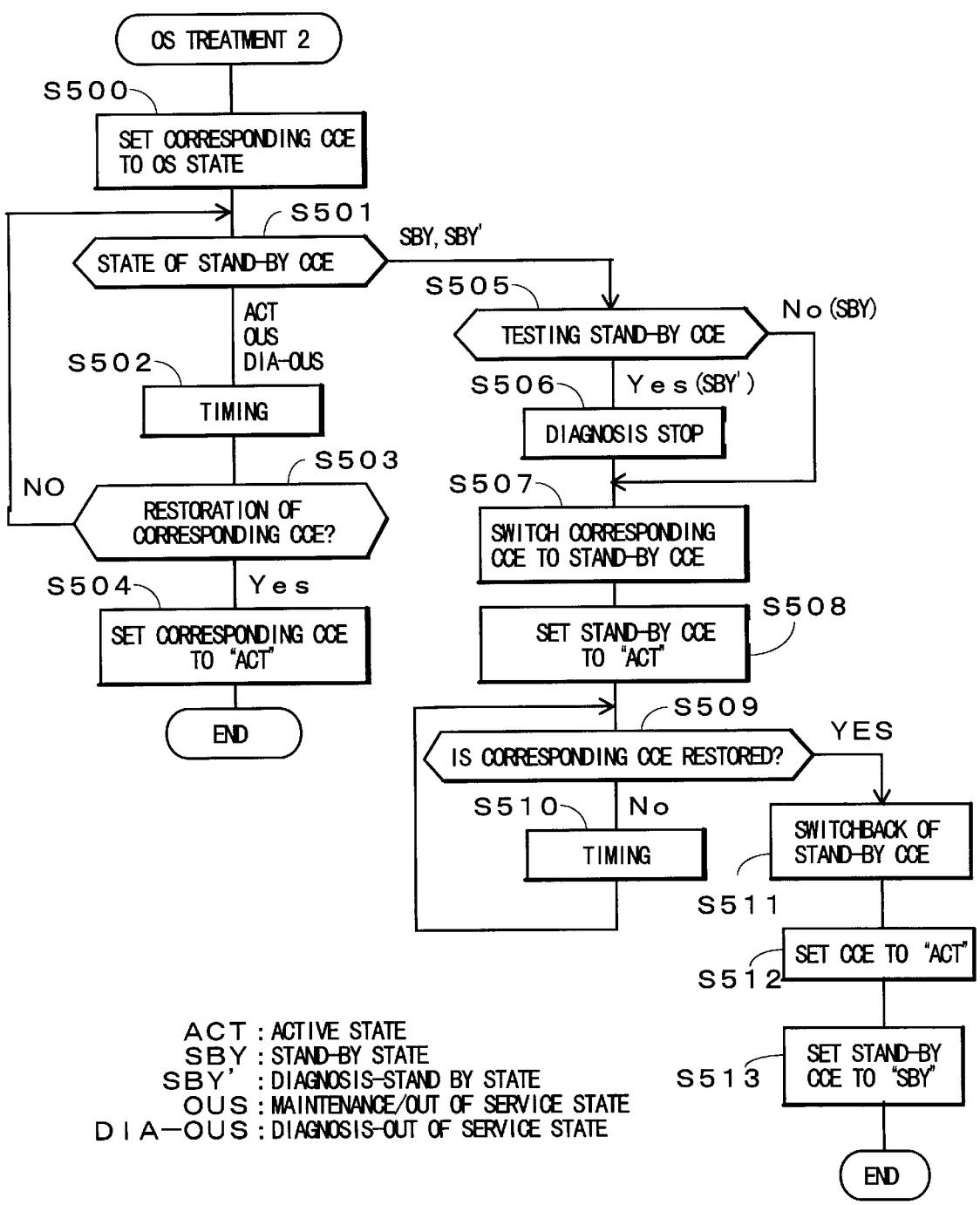
FIG. 15 is a flow chart showing an embodiment (3) of a redundant apparatus according to the present invention.

FIG. 15 shows an embodiment (3) of the present invention, and this embodiment shows a treatment procedure when the fault occurred in the circuit corresponding equipment DT0 in FIG. 10.

When a fault is detected in the circuit corresponding equipment DT0, the controller 110 sets the circuit corresponding equipment DT0 to the OS state at step S500, and then confirms the state of the stand-by circuit corresponding equipment DT2.

When the state of the circuit corresponding equipment DT2 is "ACT", "OUS" or "DIA-OUS" (step S501), the controller 110 confirms whether or not the circuit corresponding equipment DT0 is restored after a predetermined time has lapsed (step S503).

If the circuit corresponding equipment DT0 is restored, the restored circuit corresponding equipment DT0 is set to "ACT" and the processing is finished. When the circuit corresponding equipment DT0 is not restored, returning to step S501 is executed and the same operation is repeated.

If the circuit corresponding equipment is "SBY" or "SBY" under the diagnosis at step S501, step S505 is then executed. If the state of the circuit corresponding equipment is "SBY" under the diagnosis at step S505, the diagnosis is stopped rendering the state "SBY" and step S507 is then executed (step S506). If the state of the circuit corresponding equipment is "SBY", nothing is done and step S507 is then executed.

After the stand-by circuit corresponding equipment DT2 is switched over to the circuit corresponding equipment DT0 at step S507, the circuit corresponding equipment DT2 is set to the active state. The controller 110 inspects whether or not the circuit corresponding equipment DT0 is restored at step S509. If it is not the case, this inspection is repeated every predetermined time interval until the restoring is done (step S510, step S509).

If it is the case, the controller 110 switches the stand-by circuit corresponding equipment DT2 back to the circuit corresponding equipment DT0 at step S511, and the states of the circuit corresponding equipments DT0 and DT2 are returned to "ACT" and "SBY", respectively, and the further execution is finished.

It is to be noted that if the state of the stand-by circuit corresponding equipment DT2 is found as "DIA-OUS" at step S501, the stand-by circuit corresponding equipment DT2 can be separated to restore the stand-by state "SBY" before going to step S505.

Figure 16:
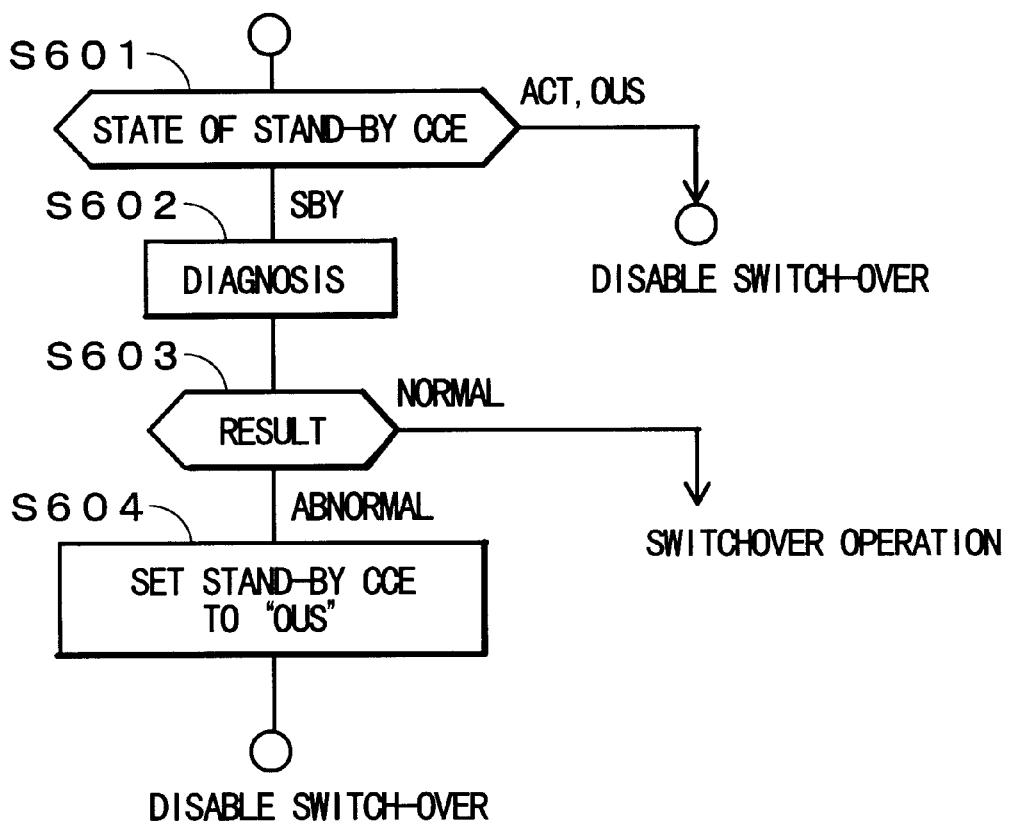
FIG. 16 is a flow chart showing an embodiment (4) of a redundant apparatus according to the present invention.
Figure 17:
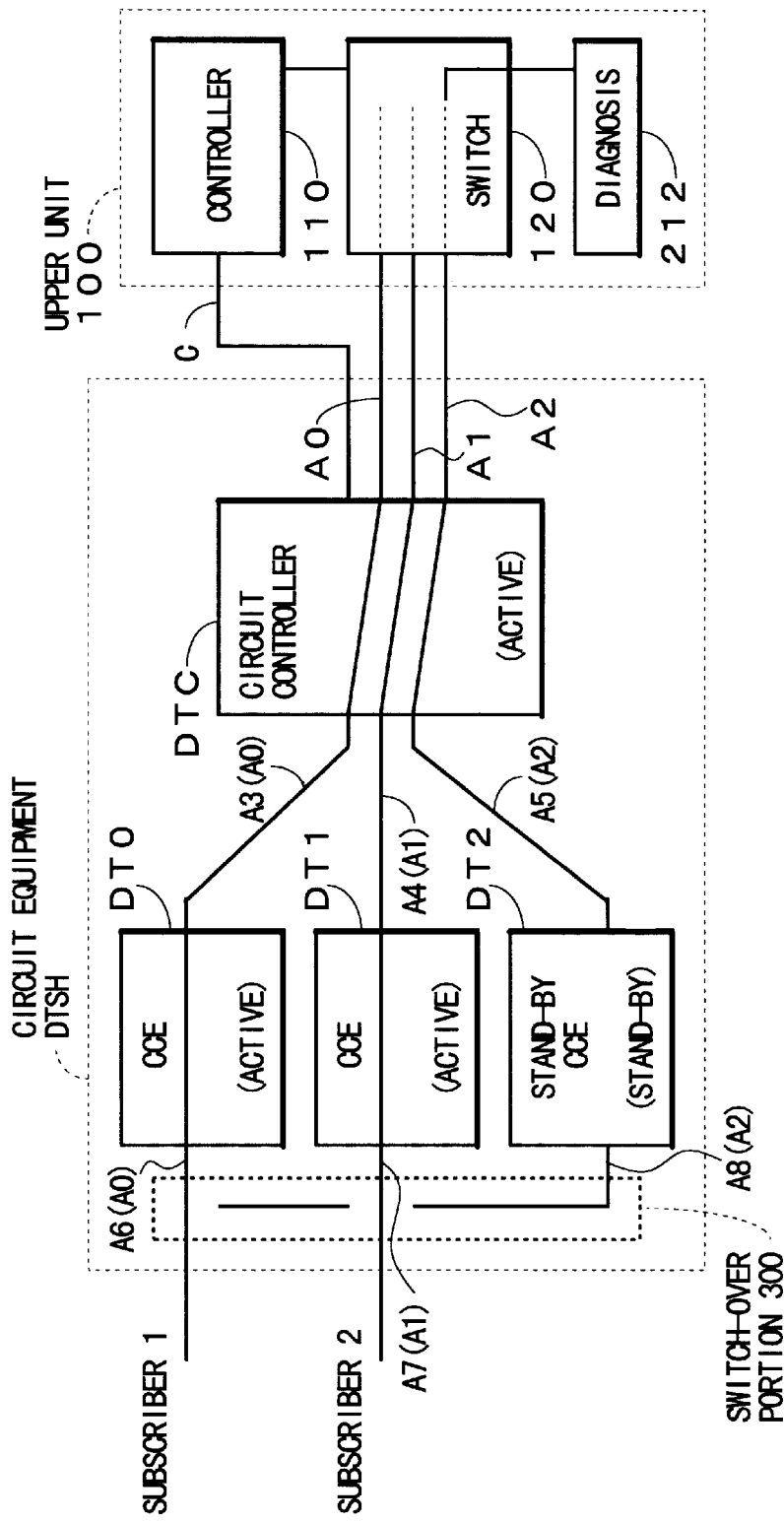
FIG. 17 is a block diagram showing the prior art redundant apparatus.
Figure 18:
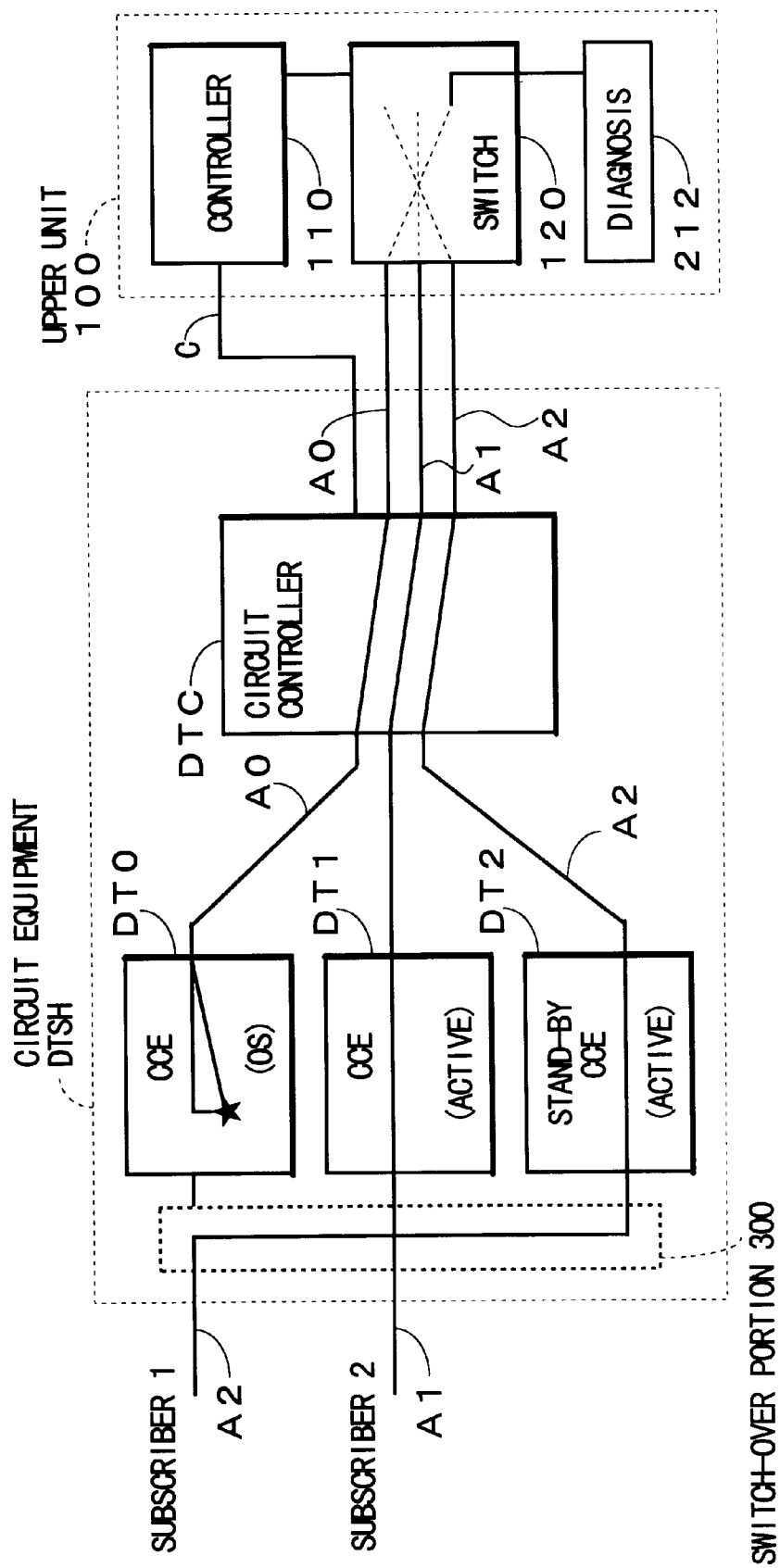
FIG. 18 is a block diagram showing an operation example when a fault has occurred in the prior art redundant apparatus.

FIG. 16 shows an embodiment (4) of the present invention, in which the process of decision is illustrated as to whether or not the circuit corresponding equipment in the OS state should be switched over to the stand-by circuit corresponding equipment.

First of all, if the stand-by circuit corresponding equipment DT2 is in the state of "ACT" or "OUS", the controller 110 does not execute the switchover. Only if it is the "SBY" state, the diagnosis is executed (step S601, step S602).

In addition, only when the result of the diagnosis is found to be normal, the controller 110 switches the circuit corresponding equipment DT0 in the OS state over to the circuit corresponding equipment DT2. If the diagnosis result is found to be abnormal, the circuit corresponding equipment DT2 is set to "OUS" and the further execution is finished.

As a result, only if the stand-by circuit corresponding equipment DT2 is normal, the switchover to the circuit corresponding equipment in the OS state is executed.

In the embodiment (1) shown in FIG. 7, the circuit corresponding equipments DT0–DT2 can be set as terminal equipments, and a system where the switch-over portion 300 and the subscribers 1, 2 are not connected under each terminal equipment can be formed.

As described above, the redundant apparatus according to the present invention is arranged so that a connection controller switches an active unit to a stand-by unit and that an upper unit is connected to the active unit through the connection controller in the normal operation, and controls the connection controller so as to switch the active unit over to the stand-by unit when a fault has occurred. Therefore, it is possible to avoid a waste of hardware resource in the upper unit.

Also the present invention is arranged so that the connection controller contains a diagnosis portion which diagnoses the stand-by unit and the active unit with a test signal and notifies the result to the upper unit. Therefore, it is possible to avoid a waste of hardware resource of the upper unit and to efficiently diagnose the active unit and the stand-by unit.

When the redundant apparatus according to the present invention is applied to e.g. an electronic switchboard, the following merits are obtained.

(1) It is not necessary to prepare a circuit which corresponds to the stand-by circuit corresponding equipment in the switch portion (exchange portion) of the upper unit. It is not necessary to always secure the capacity of the switch portion in case of fault.

(2) When the fault has occurred in the circuit corresponding equipment, the switch operation with a stand-by circuit corresponding equipment can be executed only by switching the switch of the circuit controller under the control of the upper unit (control portion). It is not required for the switch portion to set a passage again and the treatment is made simpler and higher in speed.

(3) The diagnosis to the active and the stand-by circuit corresponding equipment is executed by a diagnosis portion set inside the circuit controller. Therefore, no circuit of the switch portion is required, and setting the testing passage is not required either. As a result, the diagnosis can be executed efficiently.

What we claim is:

1. A redundant apparatus composed of an active unit and a stand-by unit to which the active unit is switched over when a fault has occurred, comprising;

a connection controller which is connected to the active unit and the stand-by unit and switches over the connection, an upper unit which is connected to the active unit through the connection controller and transmits a main signal to the active unit in a normal state, and which detects a fault in the active unit and controls the connection controller to switch the faulted active unit over to the stand-by unit, and switch-over portions which are connected between a lower unit and the active unit in a normal state and, under the control of the upper unit, switch the faulted active unit over to the stand-by unit which is connected to the lower unit in combination with the connection controller.

2. A redundant apparatus as claimed in claim 1 wherein when the faulted active unit is restored from the fault, the connection controller returns the stand-by unit and the active unit back to the initial state so as to connect the restored active unit to the upper unit under the control of the upper unit.

3. A redundant apparatus as claimed in claim 1 wherein the connection controller separates the faulted active unit from the upper unit under the control of the upper unit in the absence of a stand-by unit to be switched over.

4. A redundant apparatus as claimed in claim 3 wherein the connection controller switches the active unit which has a fault or has been separated, to the stand-by unit which has already been switched back for the connection to the upper unit when switching the active unit and the stand-by unit back to the initial state.

5. A redundant apparatus as claimed in claim 3 wherein the circuit connection controller DTC further comprises a diagnosis portion for diagnosing the active unit or the stand-by unit separated from the upper unit with a test signal under the control of the upper unit and for notifying the result to the upper unit.

6. A redundant apparatus as claimed in claim 5 wherein the diagnosis portion diagnoses the stand-by unit before the switchover, and only when there is no fault in the stand-by unit the connection controller performs the switchover.

7. A redundant apparatus as claimed in claim 5 wherein the diagnosis portion is connected to the faulted active unit for the diagnosis which has been separated from the upper unit upon the switchover.

8. A redundant apparatus as claimed in claim 5 wherein the diagnosis portion may periodically diagnose the stand-by unit under the control of the upper unit or autonomously.

9. A redundant apparatus as claimed in claim 5 wherein the diagnosis is stopped and the faulted active unit is switched over to the stand-by unit when a fault has occurred in the active unit during the diagnosis.

10. A redundant apparatus as claimed in claim 1 wherein the upper unit classifies the stand-by unit into an active state, a maintenance state, an OS (out of service) state, a stand-by state, a diagnosis-stand-by state, or a diagnosis-maintenance state which is a kind of the active state where the stand-by unit is switched over from the active unit to diagnose the active unit in the maintenance state or the OS state and controls each state so as not to switch the faulted active unit over to the stand-by unit with at least one of the active state, the maintenance state, the OS state, and the diagnosis-maintenance state.

11. A redundant apparatus as claimed in claim 10 wherein the upper unit does not periodically diagnose the stand-by unit which has at least one of active state, the maintenance state, and the OS state.

12. A redundant apparatus as claimed in claim 10 wherein the upper unit classifies the active unit into the active state, the maintenance state, or the OS state and if there is no stand-by unit to be switched over, the upper unit separate the faulted active unit from the upper unit to put the active unit into the OS state, and to switch the active unit over to the stand-by unit which is in the stand-by state, or the diagnosis-stand-by state before the restoration of the faulted active unit.

13. A redundant apparatus as claimed in claim 10 wherein the upper unit connects the active unit which is in the maintenance state to the diagnosis portion for the diagnosis.

14. A redundant apparatus as claimed in claim 10 wherein when the diagnosis portion is not connected to the active unit or the stand-by unit in the maintenance state or the OS state to be diagnosed, and when the stand-by unit is in the active state or the diagnosis-maintenance state, the upper unit does not connect the diagnosis portion to the active unit or the stand-by unit to be diagnosed.

15. A redundant apparatus as claimed in claim 10 wherein the upper unit switches the faulted active unit over to the stand-by unit in the diagnosis-maintenance state after having stopped the diagnosis for the active unit.

16. A redundant apparatus as claimed in claim 15 wherein the upper unit executes the switchover after the diagnosis instead of stopping the diagnosis for the active unit.

17. A redundant apparatus as claimed in claim 1 wherein the active unit and stand-by unit have plural units, respectively.

18. A redundant apparatus as claimed in claim 17 wherein the diagnosis portion sequentially diagnoses the plural stand-by units which are separated.

19. A redundant apparatus as claimed in claim 17 wherein the same number of diagnosis portions are provided as the stand-by units are diagnosed.

20. A redundant apparatus as claimed in claim 1 wherein the upper unit is formed of the switch portion and the controller, the connection controller is a circuit controller, and the active unit and the stand-by unit are circuit corresponding equipments and the lower unit is a subscriber's terminal equipment.

21. A redundant apparatus composed of an active unit and a stand-by unit to which the active unit is switched when a fault has occurred in the active unit, comprising;

a connection controller which is connected to the active unit and the stand-by unit and switches over the connection, and an upper unit which is normally connected to the active unit through the connection controller and transmits a main signal to the active unit and which detects a fault in the active unit and controls the connection controller to switch the faulted active unit over to the stand-by unit.

22. A redundant apparatus as claimed in claim 21 wherein the connection controller comprises a diagnosis portion which diagnoses the active unit or the stand-by unit which is separated from the upper unit under the control of the upper unit by using a test signal and notifies the result to the upper unit.

* * * * *